United States Patent
Taniguchi

(10) Patent No.: US 10,065,639 B2
(45) Date of Patent: Sep. 4, 2018

(54) LANE KEEPING ASSIST DEVICE

(71) Applicant: Nissan Motor Co., Ltd., Yokohama-shi, Kanagawa (JP)

(72) Inventor: Hiroki Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/562,938

(22) PCT Filed: Apr. 9, 2015

(86) PCT No.: PCT/JP2015/002014
§ 371 (c)(1),
(2) Date: Sep. 29, 2017

(87) PCT Pub. No.: WO2016/162902
PCT Pub. Date: Oct. 13, 2016

(65) Prior Publication Data
US 2018/0086341 A1  Mar. 29, 2018

(51) Int. Cl.
*B62D 6/00* (2006.01)
*B60W 30/12* (2006.01)
(Continued)

(52) U.S. Cl.
CPC ............. *B60W 30/12* (2013.01); *B62D 6/002* (2013.01); *B62D 6/008* (2013.01); *B62D 15/025* (2013.01); *G01P 3/64* (2013.01); *B60W 2510/205* (2013.01)

(58) Field of Classification Search
CPC ........... B60W 31/12; B60W 2510/205; B60W 30/12; B62D 6/002; B62D 6/008;
(Continued)

(56) References Cited

U.S. PATENT DOCUMENTS 6,448,728 B2 * 9/2002 Noro .................... B62D 5/0463
  180/443
9,415,803 B2   8/2016 Takeda
(Continued)

FOREIGN PATENT DOCUMENTS

CN    102233900 A    11/2011
EP      2017162 A2    1/2009
(Continued)

*Primary Examiner* — Richard A Goldman
(74) *Attorney, Agent, or Firm* — Global IP Counselors, LLP

(57) ABSTRACT

A lane keeping assist device assists a steer-by-wire vehicle to stay in a traveling lane. The lane keeping assist device controls the turning angle of the turning wheel using a first turning angle calculated to keep the vehicle in the traveling lane and using a second turning angle corresponding to the steering amount of the steering wheel. The lane keeping assist device detects a vehicle speed of the vehicle. The lane keeping assist device calculates a first reaction force command value to the steering wheel corresponding to the first turning angle and a second reaction force command value to the steering wheel corresponding to the second turning angle. The lane keeping assist device controls a steering reaction force to be imparted to the steering wheel to correspond only to the second reaction force command value when the vehicle speed is higher than a predetermined threshold value.

14 Claims, 16 Drawing Sheets

(51) Int. Cl.
*B62D 15/02* (2006.01)
*G01P 3/64* (2006.01)

(58) Field of Classification Search
CPC ... B62D 6/02; B62D 6/04; B62D 6/06; B62D 6/08; B62D 15/025; G01P 3/64
USPC .............................. 701/41, 42; 180/443, 402
See application file for complete search history.

(56) References Cited

U.S. PATENT DOCUMENTS

| | | | | |
|---|---|---|---|---|
| 9,434,411 | B2* | 9/2016 | Takeda | B62D 6/008 |
| 9,751,555 | B2* | 9/2017 | Sekiya | B62D 5/003 |
| 9,802,644 | B2* | 10/2017 | Nakamura | B62D 6/00 |
| 9,889,879 | B2* | 2/2018 | Namikawa | B62D 3/12 |
| 2003/0220727 | A1* | 11/2003 | Husain | B62D 5/006 |
| | | | | 701/41 |
| 2004/0133324 | A1* | 7/2004 | Yasui | B60T 8/172 |
| | | | | 701/41 |
| 2004/0148078 | A1* | 7/2004 | Nakano | B60C 23/00 |
| | | | | 701/41 |
| 2007/0205037 | A1* | 9/2007 | Miyajima | B62D 5/0463 |
| | | | | 180/422 |
| 2008/0185213 | A1* | 8/2008 | Mori | B62D 5/003 |
| | | | | 180/402 |
| 2008/0243339 | A1* | 10/2008 | Nishimori | B60G 7/003 |
| | | | | 701/41 |
| 2014/0012469 | A1* | 1/2014 | Kunihiro | B60W 40/072 |
| | | | | 701/41 |
| 2014/0019008 | A1* | 1/2014 | Nakamura | B62D 6/008 |
| | | | | 701/42 |
| 2014/0095006 | A1* | 4/2014 | Saito | B60L 5/045 |
| | | | | 701/22 |
| 2014/0253309 | A1 | 9/2014 | Faeuster et al. | |
| 2015/0225015 | A1* | 8/2015 | Takeda | B62D 6/008 |
| | | | | 701/41 |
| 2015/0225017 | A1* | 8/2015 | Takeda | B62D 6/008 |
| | | | | 701/41 |
| 2015/0353127 | A1* | 12/2015 | Takeda | B62D 6/008 |
| | | | | 701/41 |
| 2016/0114832 | A1* | 4/2016 | Taniguchi | B62D 6/008 |
| | | | | 701/41 |
| 2016/0159388 | A1* | 6/2016 | Sekiya | B62D 5/0409 |
| | | | | 180/446 |
| 2017/0036692 | A1* | 2/2017 | Kojo | B62D 5/008 |
| 2017/0151977 | A1* | 6/2017 | Varunjikar | B62D 5/0472 |
| 2017/0247048 | A1* | 8/2017 | Namikawa | B62D 3/12 |
| 2017/0351256 | A1* | 12/2017 | Kumakiri | B60R 16/0231 |
| 2018/0015947 | A1* | 1/2018 | Akatsuka | B62D 6/002 |
| 2018/0086341 | A1* | 3/2018 | Taniguchi | B60W 30/12 |

FOREIGN PATENT DOCUMENTS

| | | |
|---|---|---|
| JP | 2006-264374 A | 10/2006 |
| JP | 2009-113729 A | 5/2009 |
| JP | 2011-225144 A | 11/2011 |
| JP | 2014-80177 A | 5/2014 |
| JP | 2014-133521 A | 7/2014 |
| JP | 2015-9644 A | 1/2015 |
| JP | 2015-9761 A | 1/2015 |
| WO | 2014/050564 A1 | 4/2014 |
| WO | 2014/109150 A1 | 7/2014 |

* cited by examiner

LANE KEEPING ASSIST DEVICE

CROSS-REFERENCE TO RELATED APPLICATIONS

This application is a U.S. National stage application of International Application No. PCT/JP2015/002014, filed Apr. 9, 2015.

BACKGROUND

Field of the Invention

The present invention generally relates to a lane keeping assist device that carries out lane keeping control of a vehicle.

Background Information

For example, there is a technique described in Japanese Laid Open Patent Application No. 2014-80177 (Patent Document 1) as a lane keeping assist device of a vehicle. In this prior art, in a vehicle in which a steering wheel is mechanically detached from turning wheels for turning the vehicle, the steering load, when a driver carries out corrective steering to return a vehicle that is close to the edge of the lane to the center of the lane, is reduced by calculating an offset amount according to a yaw angle, which is the angle between a white line and the host vehicle traveling direction, and offsetting a steering reaction force characteristic.

SUMMARY

In a conventional lane keeping assist device, such as Patent Document 1, in a vehicle employing a steer-by-wire (SBW) system in which the steering wheel and the turning wheels are mechanically detached, the reaction force of the steering wheel and the turning angle of the turning wheels are independently controlled; therefore, even if a turning angle control is carried out, a steering reaction force that corresponds to the turning angle control is not imparted to the driver. When carrying out lane keeping control only through turning angle control in this manner, there is no problem when the vehicle is traveling at a high speed, since there is little discomfort. However, when the vehicle is traveling at a low speed, there is the possibility for discomfort to arise, since it is easy to be aware that the steering direction and the direction in which the vehicle is actually oriented are different.

An object of the present invention is to provide a lane keeping assist device with which it is possible to obtain an appropriate steering reaction force that reduces the discomfort of the driver when carrying out a lane keeping control in a low-speed region compared to the existing technology.

In order to solve the problem described above, the lane keeping assist device according to first embodiment of the present invention is a lane keeping assist device, in which a steering wheel in the vehicle and a turning wheel for turning the vehicle are mechanically detached, to travel within traveling lanes, wherein the lane keeping assist device controls the turning angle of the turning wheel using a first turning angle calculated so as to cause the vehicle to travel in the traveling lane and a second turning angle corresponding to the steering amount of the steering wheel, detects the vehicle speed of the vehicle, calculates a first reaction force command value to the steering wheel corresponding to the first turning angle and a second reaction force command value to the steering wheel corresponding to the second turning angle, controls the steering reaction force to be imparted to the steering wheel to have a steering reaction force that corresponds only to the second reaction force command value when the vehicle speed is higher than a predetermined threshold value, and controls the steering reaction force to be imparted to the steering wheel to have a steering reaction force that corresponds to the first reaction force command value and the second reaction force command value when the vehicle speed is at a predetermined threshold value or less.

According to one embodiment of the present invention, it is possible to obtain an appropriate steering reaction force that reduces the discomfort of the driver compared to the existing technology when carrying out lane keeping control in a low-speed region, by controlling the steering reaction force based on the steering amount of the steering wheel by the driver without reflecting the result of the lane keeping control to the steering reaction force in a high-speed region, and controlling the steering reaction force using a turning angle corresponding to the lane keeping control and the steering amount of the steering wheel by the driver in a low-speed region, when carrying out the lane keeping control.

BRIEF DESCRIPTION OF THE DRAWINGS

Referring now to the drawings, a vehicle with a lane keeping assist device is illustrated.

DETAILED DESCRIPTION OF THE EMBODIMENTS

One illustrative embodiment of the present invention will be described below with reference to the appended drawings.

Figure 1:
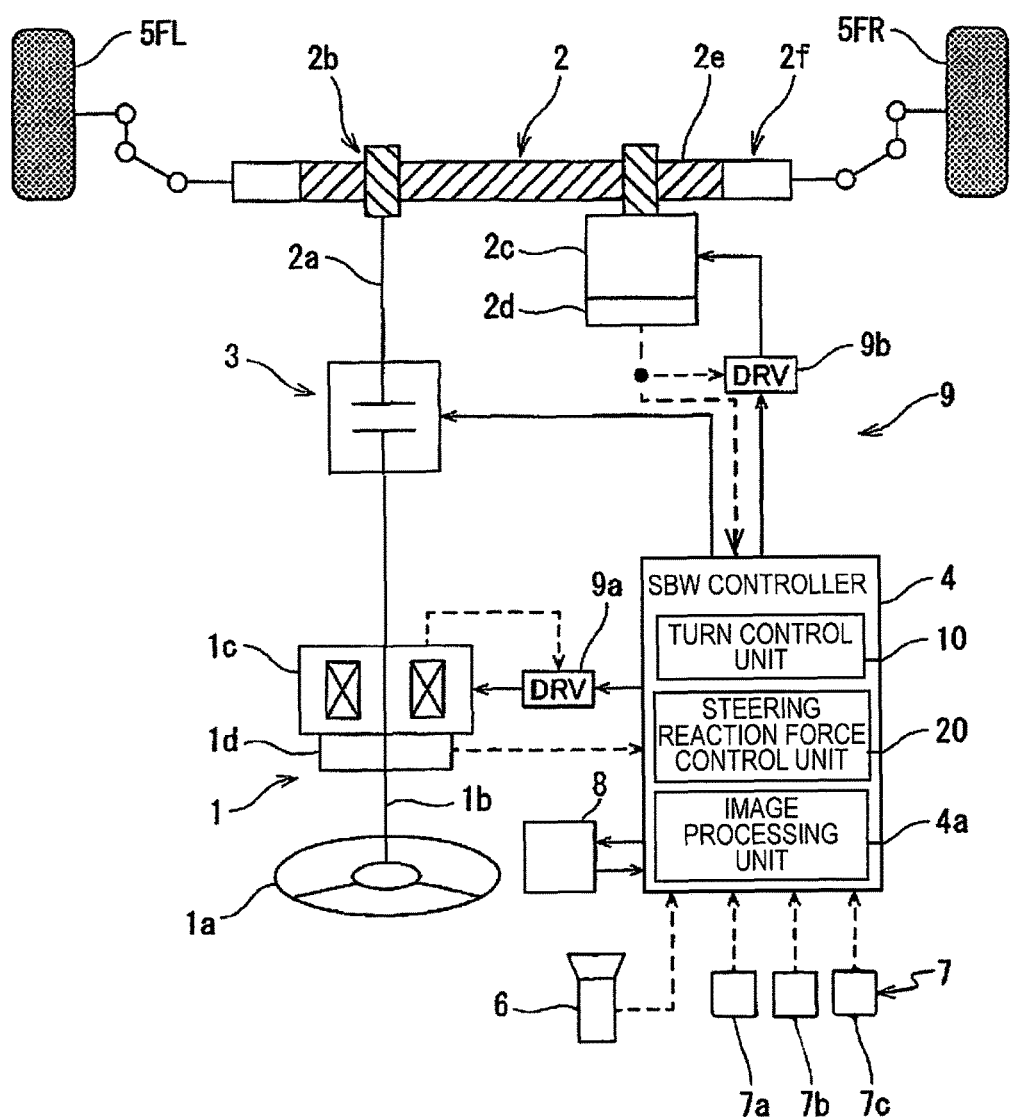
FIG. 1 is a schematic diagram of a configuration example of a steering system of a vehicle equipped with a lane keeping assist device.

FIG. 1 is a block diagram illustrating a configuration example of the steering system of a vehicle A equipped with a lane keeping assist device according to the present invention. The vehicle A comprises a steering unit 1, a turning unit 2, a backup clutch 3, and an SBW controller 4, as illustrated in FIG. 1. The vehicle A employs a steer-by-wire (SBW) system, in which the steering unit 1, which receives steering input from a driver, is mechanically detached from the turning unit 2, which turns left and right front wheels 5FL, 5FR, which are the turning wheels. The steering unit 1 comprises a steering wheel 1a, a column shaft 1b, a reaction force motor 1c, a steering angle sensor 1d, and a torque sensor 1e.

The steering wheel 1a rotates by receiving a steering input of the driver. The column shaft 1b rotates integrally with the steering wheel 1a. The reaction force motor 1c has an output shaft coaxial with the column shaft 1b, and outputs a steering reaction force torque to be imparted to the steering wheel 1a by the column shaft 1b in response to a command (command current output by the reaction force motor current driver 9a described later) from the SBW controller 4. For example, the reaction force motor 1c is a brushless motor. The steering angle sensor 1d detects the rotation angle of the column shaft 1b, that is, the steering angle (steering wheel angle) of the steering wheel 1a. Then, the steering angle sensor 1d outputs the detection result to the SBW controller 4 described later.

The turning unit 2 comprises a pinion shaft 2a, a steering gear 2b, a turning motor 2c, a turning angle sensor 2d, a rack 2f, and a rack gear 2e.

The steering gear 2b turns the left and right front wheels 5FL, 5FR according to the rotation of the pinion shaft 2a. For example, a rack-and-pinion-type steering gear can be employed as the steering gear 2b. The turning motor 2c has an output shaft connected to the rack gear 2e via a decelerator, and outputs a turning torque for turning the left and right front wheels 5FL, 5FR to the rack 2f in accordance with a command (command current output by the turning motor current driver 9b described later) from the SBW controller 4. For example, the turning motor 2c is a brushless motor. The turning angle sensor 2d detects the rotation angle of the turning motor 2c. Here, there is a uniquely determined correlation between the rotation angle of the turning motor 2c and the turning angle (tire angle) of the left and right front wheels 5FL, 5FR. Accordingly, the turning angle of the left and right front wheels 5FL, 5FR can be detected from the rotation angle of the turning motor 2c. Hereinbelow, unless otherwise noted, the turning angle of the left and right front wheels 5FL, 5FR is calculated from the rotation angle of the turning motor 2c.

The backup clutch 3 is provided between the column shaft 1b and the pinion shaft 2a. The backup clutch 3 mechanically detaches the steering unit 1 and the turning unit 2 when in a released state, and mechanically connects the steering unit 1 and the turning unit 2 when in a fastened state. In addition, the vehicle A comprises a camera 6, various sensors 7, a navigation system 8 and a current driver 9. The camera 6 detects an image of the traveling path in front of the vehicle A. Next, the camera 6 outputs the detection result to the SBW controller 4. The various sensors 7 include a vehicle speed sensor 7a, an acceleration sensor 7b, and a yaw rate sensor 7c. The vehicle speed sensor 7a detects the vehicle speed of the vehicle A. Next, the vehicle speed sensor 7a outputs the detection result to the SBW controller 4.

The acceleration sensor 7b detects the acceleration of the vehicle A in the longitudinal direction (longitudinal acceleration) and the acceleration of the vehicle A in the lateral direction (lateral acceleration). Then, the acceleration sensor 7b outputs the detection result to the SBW controller 4. The yaw rate sensor 7c detects the yaw rate of the vehicle A (state quantity of the vehicle A that is varied by the tire lateral force that acts on the left and right front wheels 5FL, 5FR). Then, the yaw rate sensor 7c outputs the detection result to the SBW controller 4.

The navigation system 8 comprises a GPS (Global Positioning System) receiver, a map database and a display monitor. Then, the navigation system 8 acquires the position and road information of the vehicle A from the GPS receiver and the map database. Subsequently, the navigation system 8 carries out a route search based on the acquired position and road information of the vehicle A. Subsequently, the navigation system 8 displays the result of the route search on the display monitor. In addition, the navigation system 8 outputs the road information of the traveling path of the vehicle A from among the acquired road information to the SBW controller 4. For example, the road information of the traveling path is the type of traveling path (expressway, general road), and the lane width of the traveling path of the current vehicle position (lane width information), and the like.

The current driver 9 includes a reaction force motor current driver 9a and a turning motor current driver 9b. The reaction force motor current driver 9a controls the command current to the reaction force motor 1c by a torque feedback for matching the actual steering reaction force torque inferred from the current value of the reaction force motor 1c with the command steering reaction force torque from the SBW controller 4. The turning motor current driver 9b controls the command current to the turning motor 2c by an angle feedback for matching the actual turning angle detected by the turning angle sensor 2d with the command turning angle from the SBW controller 4. The SBW controller 4 acquires the detection results (various information) that are output by the steering angle sensor 1d, the torque sensor 1e, the turning angle sensor 2d, the camera 6, the vehicle speed sensor 7a, the acceleration sensor 7b, the yaw rate sensor 7c, and the navigation system 8. For example, the SBW controller 4 is an electronic control device (ECU), or the like.

In the present embodiment, the SBW controller 4 comprises an image processing unit 4a, a turn control unit 10, and a steering reaction force control unit 20. In practice, the image processing unit 4a, the steering reaction force control unit 20, and the turn control unit 10 may be independent circuits or devices, respectively. The image processing unit 4a detects the left and right traveling path dividing lines (road white lines) of the traveling lane by carrying out image processing, such as by edge extraction, from an image of a traveling path in front of the vehicle A acquired from the camera 6. In practice, the road white line may be a yellow line or a broken line. In addition, when a road white line does not exist, or is difficult to detect, it is possible to detect the road shoulder, curb, side groove, guardrail (protective fence), soundproof wall, retaining wall, the center dividing line, and the like, instead of a road white line. Then, the image processing unit 4a outputs the detection result of the left and right traveling path dividing lines of the traveling lane (white line information) to the turn control unit 10 and the steering reaction force control unit 20.

The turn control unit 10 calculates a command for controlling the turning angle of the left and right front wheels 5FL, 5FR based on the various acquired information. Then, the turn control unit 10 outputs the calculated command turning angle to the turning motor current driver 9b. The details of the turn control unit 10 will be described later. The steering reaction force control unit 20 calculates a command for controlling the steering reaction force torque to be imparted to the column shaft 1b, based on the various acquired information. Then, the steering reaction force control unit 20 outputs the calculated command steering reaction force torque to the reaction force motor current driver 9a. The details of the steering reaction force control unit 20 will be described later.

Figure 2:
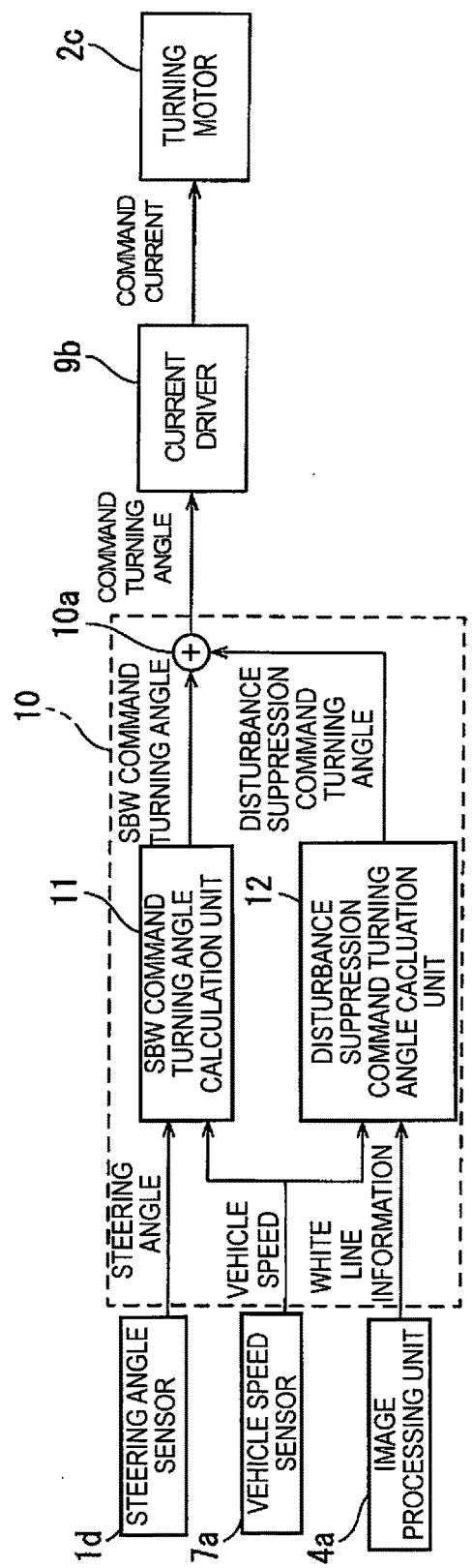
FIG. 2 is a block diagram illustrating a configuration example of a turn control unit.

FIG. 2 is a block diagram illustrating a configuration example of the turn control unit 10. The turn control unit 10 comprises an SBW command turning angle calculation unit 11, a disturbance suppression command turning angle calculation unit 12, and an adder 10a, as illustrated in FIG. 2. The SBW command turning angle calculation unit 11 calculates a turning angle (SBW command turning angle) so as to be a turning angle of the left and right front wheels 5FL, 5FR corresponding to the steering of the steering wheel 1a, based on the detection results (steering angle, vehicle speed) that are output by the steering angle sensor 1d and the vehicle speed sensor 7a. Then, the SBW command turning angle calculation unit 11 outputs the calculation result to the adder 10a.

The disturbance suppression command turning angle calculation unit 12 calculates a turning angle (disturbance suppression command turning angle) for correcting the calculation result (SBW command turning angle) output by the SBW command turning angle calculation unit 11, based on the detection results (vehicle speed, white line information) that are output by the vehicle speed sensor 7a and the image processing unit 4a. For example, the disturbance suppression command turning angle is a turning angle for reducing the yaw angle (described later), etc., generated due to a disturbance. Then, the disturbance suppression command turning angle calculation unit 12 outputs the calculation result to the adder 10a. The adder 10a adds the calculation result (SBW command turning angle) output by the SBW command turning angle calculation unit 11 to the calculation result (disturbance suppression command turning angle) output by the disturbance suppression command turning angle calculation unit 12. The adder 10a thereby corrects the SBW command turning angle with the disturbance suppression command turning angle. Then, the adder 10a outputs the addition result to the turning motor current driver 9b as the command turning angle.

Figure 3:
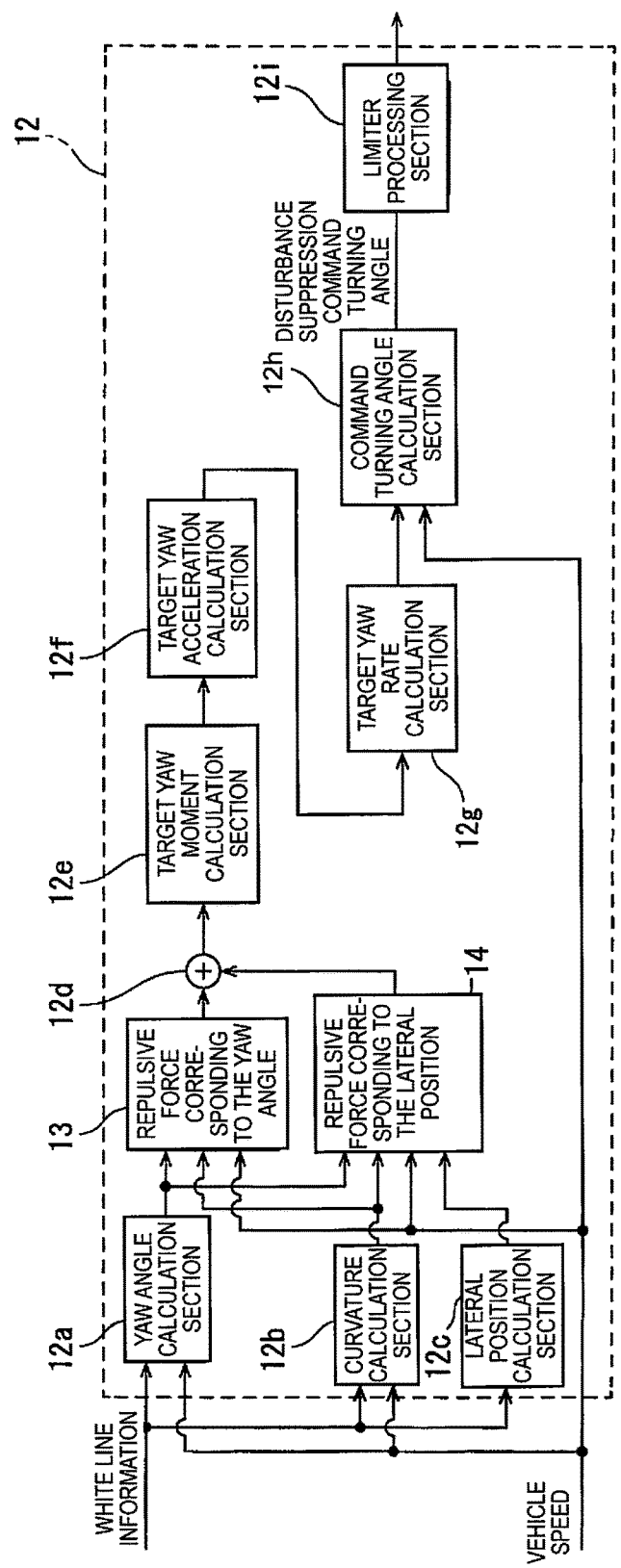
FIG. 3 is a block diagram illustrating a configuration example of a disturbance suppression command turning angle calculation unit.

FIG. 3 is a block diagram illustrating a configuration example of the disturbance suppression command turning angle calculation unit 12. The disturbance suppression command turning angle calculation unit 12 comprises a yaw angle calculation section 12a, a curvature calculation section 12b, a lateral position calculation section 12c, a repulsive force corresponding to the yaw angle calculation unit 13, a repulsive force corresponding to the lateral position calculation unit 14, an adder 12d, a target yaw moment calculation section 12e, a target yaw acceleration calculation section 12f, a target yaw rate calculation section 12g, a command turning angle calculation section 12h, and a limiter processing section 12i, as illustrated in FIG. 3. The yaw angle calculation section 12a calculates the yaw angle at a forward gazing point, based on the detection results that are output by the vehicle speed sensor 7a and the image processing unit 4a (vehicle speed, white line information). An example of a yaw angle at the forward gazing point may be the angle between the traveling lane (road white line) after a set time (for example, 0.5 seconds) and the traveling direction of the vehicle A. Then, the yaw angle calculation section 12a outputs the calculation result to the repulsive force corresponding to the yaw angle calculation unit 13 and the repulsive force corresponding to the lateral position calculation unit 14.

The curvature calculation section 12b calculates the curvature of the road white line at a forward gazing point, based on the detection results that are output by the vehicle speed sensor 7a and the image processing unit 4a (vehicle speed, white line information). An example of the curvature of the road white line at the forward gazing point is the curvature of the traveling lane (road white line) at the position of the vehicle A after a set time (0.5 seconds). Then, the curvature calculation section 12b outputs the calculation result to the repulsive force corresponding to the yaw angle calculation unit 13 and the repulsive force corresponding to the lateral position calculation unit 14. The lateral position calculation section 12c calculates the distance (lateral position) from the vehicle A to the road white line at a forward gazing point (hereinafter also referred to as the lateral position at the forward gazing point), based on the detection result (white line information) output by the image processing unit 4a. An example of the lateral position at the forward gazing point is the distance (lateral position) from the position of the vehicle A to the road white line after the set time (0.5 seconds). Then, lateral position calculation section 12c outputs the calculation result to the repulsive force corresponding to the lateral position calculation unit 14.

The repulsive force corresponding to the yaw angle calculation unit 13 carries out yaw angle feedback control (turn control), based on the detection results (yaw angle at the forward gazing point, curvature of the road white line at the forward gazing point, vehicle speed) that are output by the yaw angle calculation section 12a, the curvature calculation section 12b, and the vehicle speed sensor 7a. In the yaw angle feedback control, the repulsive force of the vehicle A for reducing the yaw angle generated due to disturbance (hereinafter also referred to as the repulsive force corresponding to the yaw angle) is calculated. As a result, in the yaw angle feedback control, the turning angle of the left and right front wheels 5FL, 5FR is controlled in a direction in which the yaw angle is reduced, based on the yaw angle at the forward gazing point. Then, the repulsive force corresponding to the yaw angle calculation unit 13 outputs the calculation result to the adder 12d. The details of the repulsive force corresponding to the yaw angle calculation unit 13 will be described later.

The repulsive force corresponding to the lateral position calculation unit 14 carries out lateral position feedback control (turning angle control), based on the detection results (yaw angle at the forward gazing point, curvature of the road white line at the forward gazing point, lateral position at the forward gazing point, vehicle speed) that are output by the yaw angle calculation section 12a, the curvature calculation section 12b, the lateral position calculation section 12c, and the vehicle speed sensor 7a. In the lateral position feedback control, the repulsive force of the vehicle A for reducing the lateral position change generated due to disturbance (hereinafter also referred to as the repulsive force corresponding to the lateral position) is calculated. As a result, in the lateral position feedback control, the turning angle of the left and right front wheels 5FL, 5FR is controlled in a direction in which the vehicle A moves in the central direction of the traveling lane, that is, in a direction in which the lateral position is reduced, based on the lateral position at the forward gazing point. Then, the repulsive force corresponding to the lateral position calculation unit 14 outputs the calculation result to the adder 12d. The details of the repulsive force corresponding to the lateral position calculation unit 14 will be described later.

The adder 12d adds the calculation result output by the repulsive force corresponding to the yaw angle calculation unit 13 (repulsive force corresponding to the yaw angle) to the calculation result output by the repulsive force corresponding to the lateral position calculation unit 14 (repulsive force corresponding to the lateral position). Then, the adder 12d outputs the addition result (hereinafter also referred to as the lateral direction repulsive force) to the target yaw moment calculation section 12e. The target yaw moment calculation section 12e calculates the target yaw moment based on the calculation result output by the adder 12d (lateral direction repulsive force). Specifically, the target yaw moment calculation section 12e calculates a target yaw moment M* according to the following formula (1), based on the lateral direction repulsive force, the wheelbase WHEELBASE, the rear wheel axle load, and the front wheel axle load. Then, the target yaw moment calculation section 12e outputs the calculation result to the target yaw acceleration calculation section 12f.

$$M^* = \text{lateral direction repulsive force} \times (\text{rear wheel axle load}/(\text{front wheel axle load}+\text{rear wheel axle load})) \times \text{WHEELBASE} \quad (1)$$

The target yaw acceleration calculation section 12f calculates the target yaw acceleration based on the calculation result output by the target yaw moment calculation section 12e (target yaw moment). Specifically, the target yaw acceleration calculation section 12f multiplies the target yaw moment by a predetermined yaw inertia moment coefficient. Then, the target yaw acceleration calculation section 12f outputs the multiplication result to the target yaw rate calculation section 12g as the target yaw acceleration. The target yaw rate calculation section 12g calculates the target yaw rate (change rate of the yaw angle), based on the calculation result output by the target yaw acceleration calculation section 12f (target yaw acceleration). Specifically, the target yaw rate calculation section 12g multiplies the target yaw acceleration by a headway time. Then, the target yaw rate calculation section 12g outputs the multiplication result to the command turning angle calculation section 12h as the target yaw rate.

The command turning angle calculation section 12h calculates a disturbance suppression command turning angle, based on the detection results that are output by the target yaw rate calculation section 12g and the vehicle speed sensor 7a (target yaw rate, vehicle speed). Specifically, the command turning angle calculation section 12h calculates the disturbance suppression command turning angle δst* according to the following formula (2), based on the target yaw rate φ*, the vehicle speed V, the wheelbase WHEELBASE, and the characteristic velocity Vch of the vehicle A. Here, an example of the characteristic velocity Vch of the vehicle A is a parameter in the well-known Ackerman Equation, representing the self-steering characteristics of the vehicle A. Then, the command turning angle calculation section 12h outputs the calculation result to the limiter processing section 12i.

$$\delta st^* = (\varphi^* \times \text{WHEELBASE} \times (1+(V/Vch)^2) \times 180)/(V \times MPI) \quad (2)$$

MPI is a predetermined coefficient.

The limiter processing section 12i limits the maximum value and the upper limit of the change rate of the calculation result output by the command turning angle calculation section 12h (disturbance suppression command turning angle δst*). In a conventional steering device (steering device in which the steering unit 1 and the turning unit 2 are mechanically connected), when the steering angle of the steering wheel 1a is in an angle range of the play near the neutral position (for example, 3° to the left and right), the maximum value of the disturbance suppression command turning angle δst* shall be the turning angle range of the left and right front wheels 5FL, 5FR corresponding to the range of the play (for example, 0.2° to the left and right). Then, the limiter processing section 12i outputs the limited disturbance suppression command turning angle δst* to the adder 10a (refer to FIG. 2).

Figure 4:
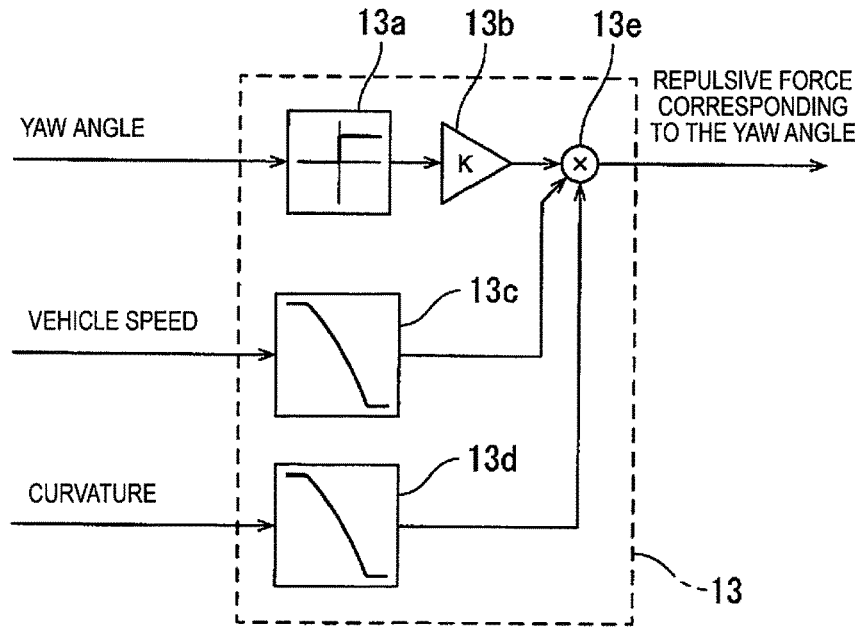
FIG. 4 is a block diagram illustrating a configuration example of a repulsive force corresponding to the yaw angle calculation unit.

FIG. 4 is a block diagram illustrating a configuration example of the repulsive force corresponding to the yaw angle calculation unit 13. The repulsive force corresponding to the yaw angle calculation unit 13 comprises an upper and lower limiter 13a, a setting gain multiplication section 13b, a vehicle speed correction gain multiplication section 13c, a curvature correction gain multiplication section 13d, and a multiplier 13e, as illustrated in FIG. 4. The upper and lower limiter 13a carries out an upper and lower limiter processing on the calculation result output by the yaw angle calculation section 12a (yaw angle at the forward gazing point). In the upper and lower limiter processing, for example, when the yaw angle is a positive value (the yaw angle is positive when the road white line intersects a line extending in the traveling direction of the vehicle A), the value is set to be equal to or greater than a predetermined value capable of suppressing disturbance, and less than a value when the vehicle will vibrate as well as a value generated by the steering of the driver (upper limit value is for example 1°). In addition, in the upper and lower limiter processing, the value is set to 0 when, for example, the yaw angle is negative. Then, the upper and lower limiter 13a outputs the yaw angle after the upper and lower limiter processing to the setting gain multiplication section 13b. As a result, the yaw angle after the upper and lower limiter processing becomes a positive value only when a yaw angle is generated.

The setting gain multiplication section 13b multiples the calculation result output by the upper and lower limiter 13a (yaw angle after the upper and lower limiter processing) by a predetermined setting gain. The setting gain is, for example, a value equal to or greater than a value with which an insufficient control amount can be avoided while ensuring responsiveness. In addition, the setting gain shall be less than a value at which the vehicle A will vibrate, as well as a value at which the driver will feel a neutral misalignment between the steering angle and the turning angle. Then, the setting gain multiplication section 13b outputs the multiplication result (hereinafter also referred to as setting gain after upper limit multiplication) to the multiplier 13e. The vehicle speed correction gain multiplication section 13c multiplies the detection result output by the vehicle speed sensor 7a (vehicle speed) by a predetermined vehicle speed correction gain. For example, the vehicle speed correction gain becomes the maximum value when the vehicle speed is in the range of 0-70 km/h, decreases as the vehicle speed increases in the vehicle speed range of 70-130 km/h, and becomes the minimum value (for example, substantially zero) when the vehicle speed is in the range of 130 km/h or more. Then, the vehicle speed correction gain multiplication section 13c outputs the multiplication result to the multiplier 13e.

The curvature correction gain multiplication section 13d multiplies the detection result output by the curvature calculation section 12b (curvature at the forward gazing point) by a predetermined curvature correction gain. For example, the curvature correction gain becomes the maximum value when the curvature is in the range of R1-R2 (>R1), decreases as the curvature increases in the curvature range of R2-R3 (>R2), and becomes the minimum value (for example, substantially zero) when the curvature is in the range of R3 or more. Then, the curvature correction gain multiplication section 13d outputs the multiplication result to the multiplier 13e. As a result, the curvature correction gain multiplication section 13d is able to reduce the multiplication result as the curvature at the forward gazing point is increased.

The multiplier 13e multiplies the calculation results output by the setting gain multiplication section 13b, the vehicle speed correction gain multiplication section 13c, and the curvature correction gain multiplication section 13d with each other. Then, the multiplication result is output to the adder 12d as the repulsive force corresponding to the yaw angle. As a result, the disturbance suppression command turning angle calculation unit 12 carries out a yaw angle feedback control, only when a yaw angle is generated. In addition, the multiplier 13e (turn control unit 10) is able to reduce the absolute value of the repulsive force corresponding to the yaw angle, as the curvature at the forward gazing point is increased. Therefore, the turn control unit 10 can reduce the repulsive force corresponding to the yaw angle, when, for example, the vehicle A travels on a curve (curved road) with a small curvature radius. Accordingly, the turn control unit 10 is able to suppress turning of the left and right front wheels 5FL, 5FR in a direction in which the yaw angle decreases. The driver can thereby drive the vehicle A along a more appropriate route.

Figure 5:
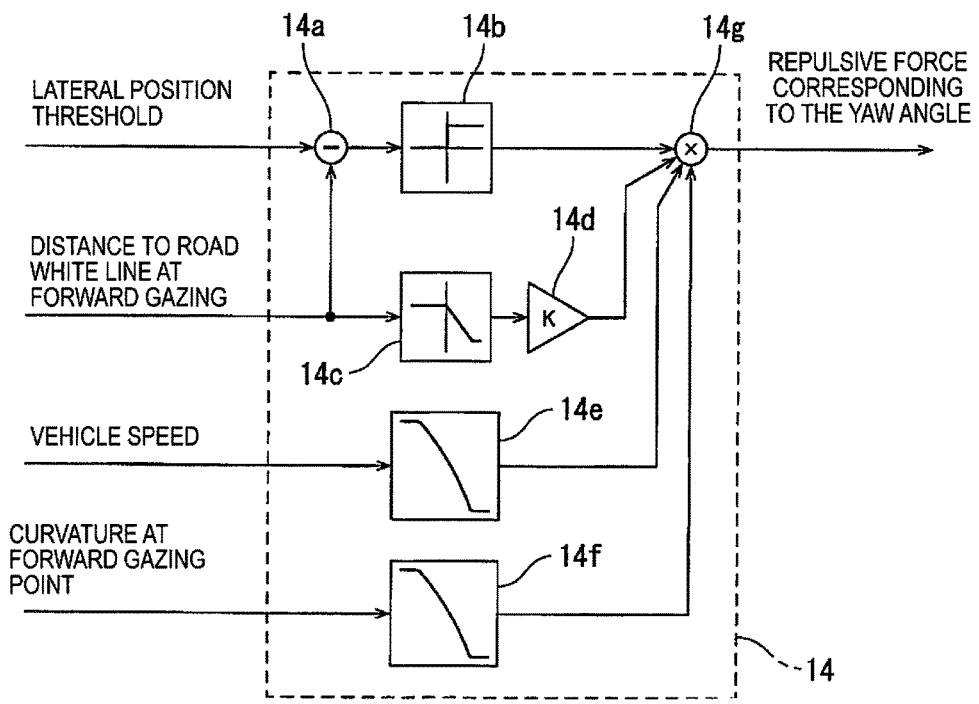
FIG. 5 is a block diagram illustrating a configuration example of a repulsive force corresponding to the lateral position calculation unit.

FIG. 5 is a block diagram illustrating a configuration example of the repulsive force corresponding to the lateral position calculation unit 14. The repulsive force corresponding to the lateral position calculation unit 14 comprises a subtractor 14a, an upper and lower limiter 14b, a distance correction gain multiplication section 14c, a lateral position feedback gain multiplication section 14d, a vehicle speed correction gain multiplication section 14e, and a curvature correction gain multiplication section 14f, as illustrated in FIG. 5. The subtractor 14a subtracts the calculation result output by the lateral position calculation section 12c (distance (lateral position) from the vehicle A to the road white line at the forward gazing point) from a predetermined lateral position threshold value (for example, 90 cm). Then, the subtractor 14a outputs the subtraction result (hereinafter also referred to as lateral position deviation) to the upper and lower limiter 14b. As a result, the lateral position deviation becomes a positive value only when the distance from the vehicle A to the road white line at the forward gazing point is less than 90 cm (when on the adjacent lane side).

The upper and lower limiter 14b carries out an upper and lower limiter processing on the calculation result output by the subtractor 14a (lateral position deviation). In the upper and lower limiter processing, for example, the value takes a predetermined positive value when the lateral position deviation is a positive value, and zero when the lateral position deviation is a negative value. Then, the upper and lower limiter 14b outputs the lateral position deviation after the upper and lower limiter processing to the multiplier 14g. As a result, the lateral position deviation after the upper and lower limiter processing becomes a positive value only when the distance from the vehicle A to the road white line at the forward gazing point is less than 90 cm (when on the adjacent lane side).

The distance correction gain multiplication section 14c multiplies the calculation result output by the lateral position calculation section 12c (lateral position at the forward gazing point) by the distance correction gain. For example, the distance correction gain becomes the maximum value when the distance (lateral position) from the vehicle A to the road white line is in the range of Y1-Y2 (>Y1), decreases as the lateral position increases in the lateral position range of Y2-Y3 (>Y2), and becomes the minimum value when the lateral position is in the range of Y3 or more. Then, the lateral position feedback gain multiplication section 14c outputs the multiplication result (hereinafter also referred to as corrected distance to the road white line) to the lateral position feedback gain multiplication section 14d.

The lateral position feedback gain multiplication section 14d multiplies the calculation result output by the distance correction gain multiplication section 14c (corrected distance to the road white line) by a predetermined lateral position feedback gain. The lateral position feedback gain is, for example, a value equal to or greater than a setting value with which an insufficient control amount can be avoided while ensuring responsiveness. In addition, the lateral position feedback gain shall be less than a value at which the vehicle A will vibrate, as well as a value at which the driver will feel a neutral misalignment. Furthermore, the lateral position feedback gain shall be a value smaller than the yaw angle feedback gain. Then, the lateral position feedback gain multiplication section 14d outputs the multiplication result to the multiplier 14g.

The vehicle speed correction gain multiplication section 14e multiplies the detection result output by the vehicle speed sensor 7a (vehicle speed) by a predetermined vehicle speed correction gain. For example, the vehicle speed correction gain becomes the maximum value when the vehicle speed is in the range of 0-70 km/h, decreases as the vehicle speed increases in the vehicle speed range of 70-130 km/h, and becomes the minimum value (for example, zero) when the vehicle speed is in the range of 130 km/h or more. Then, the vehicle speed correction gain multiplication section 14e outputs the multiplication result to the multiplier 14g. The curvature correction gain multiplication section 14f multiplies the detection result output by the curvature calculation section 12b (curvature at the forward gazing point) by a predetermined curvature correction gain. For example, the curvature correction gain becomes the maximum value when the curvature at the forward gazing point is in the range of R1-R2 (>R1), decreases as the curvature increases in the curvature range of R2-R3 (>R2), and becomes the minimum value (for example, zero) when the curvature is in the range of R3 or more. Then, the curvature correction gain multiplication section 14f outputs the multiplication result to the multiplier 14g.

Figure 6:
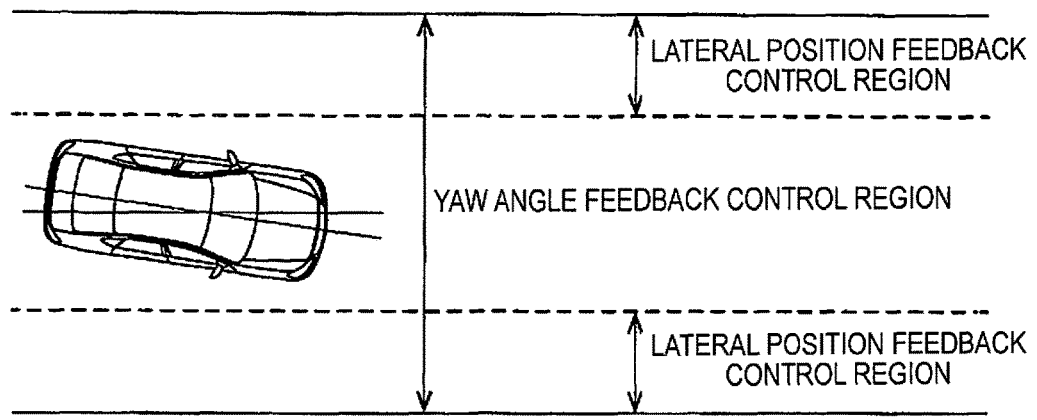
FIG. 6 is a diagram illustrating an execution region of a lateral position feedback control.

FIG. 6 is a diagram illustrating the execution region of the lateral position feedback control. The multiplier 14g multiplies the calculation results that are output by the lateral position feedback gain multiplication section 14d, the vehicle speed correction gain multiplication section 14e, and the curvature correction gain multiplication section 14f with each other. Then, the multiplier 14g outputs the multiplication result (hereinafter also referred to as repulsive force corresponding to the lateral position) to the adder 12d. As a result, the disturbance suppression command turning angle calculation unit 12 carries out lateral position feedback control only when the distance from the vehicle A to the road white line at the forward gazing point is less than 90 cm, that is, when the vehicle is further on the adjacent lane side than a position 90 cm from the road white line. That is, the vicinity of the center of the traveling lane is a region in which lateral position feedback control is not carried out (dead zone), as illustrated in FIG. 6. In addition, the multiplier 14g (turn control unit 10) is able to reduce the absolute value of the repulsive force corresponding to the lateral position, as the curvature at the forward gazing point is increased. Therefore, the turn control unit 10 can reduce the repulsive force corresponding to the lateral position, when, for example, the vehicle A travels on a curve with a small curvature radius. Accordingly, the turn control unit 10 is able to suppress turning of the left and right front wheels 5FL, 5FR in a direction in which the lateral position decreases. The driver can thereby drive the vehicle A along a more appropriate route.

Figure 7:
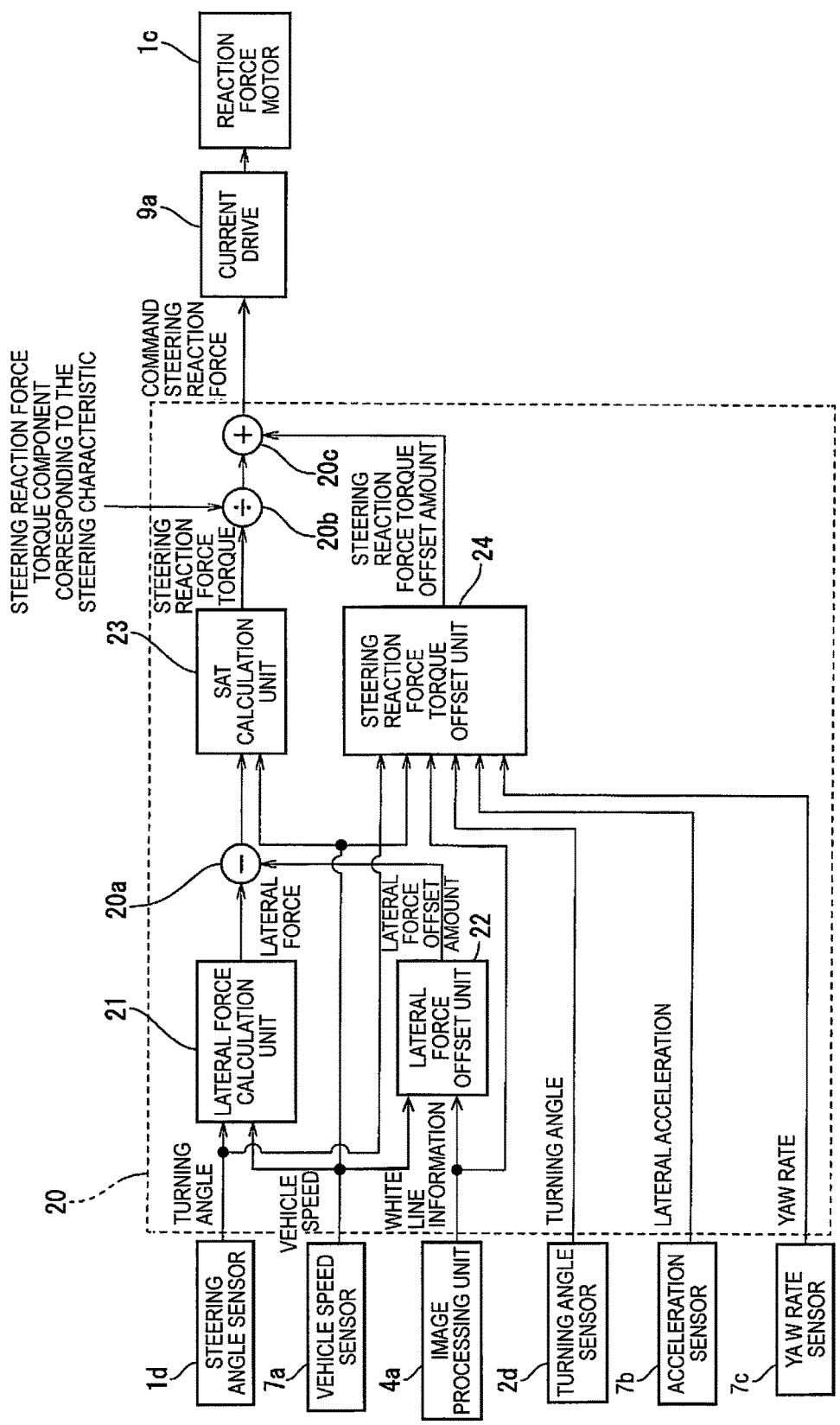
FIG. 7 is a block diagram illustrating a configuration example of a steering reaction force control unit.

FIG. 7 is a block diagram illustrating a configuration example of the steering reaction force control unit 20. The steering reaction force control unit 20 comprises a lateral force calculation unit 21, a lateral force offset unit 22, a subtractor 20a, a SAT calculation unit 23, an adder 20b, a steering reaction force torque offset unit 24 and an adder 20c, as illustrated in FIG. 7. The lateral force calculation unit 21 calculates a tire lateral force by referencing a steering angle-lateral force conversion map (MAP), based on the detection results that are output by the steering angle sensor 1d and the vehicle speed sensor 7a (steering angle, vehicle speed). That is, the lateral force calculation unit 21 calculates the tire lateral force based on the steering angle and the vehicle speed, and the steering angle-lateral force conversion map. For example, the steering angle-lateral force conversion map is a map representing the relationship between the tire lateral force and the steering angle for each vehicle speed in a conventional steering device (steering device in which the steering unit 1 and the turning unit 2 are mechanically connected), which is calculated in advance by experiments or the like. In the steering angle-lateral force conversion map, the tire lateral force is set to a larger value as the steering angle is increased. In addition, in a steering angle-lateral force conversion map, the amount of change of the tire lateral force relative to the amount of change of the steering angle is made larger when the steering angle is small, compared to when the steering angle is large. Furthermore, in the steering angle-lateral force conversion map, the tire lateral force is made a smaller value as the vehicle speed is increased. Then, the lateral force calculation unit 21 outputs the calculation result to the subtractor 20a.

The lateral force offset unit 22 calculates the lateral force offset amount, based on the detection results that are output by the vehicle speed sensor 7a and the image processing unit 4a (vehicle speed, white line information). For example, the lateral force offset amount is an offset amount for offsetting the steering reaction force characteristic that represents the steering reaction force torque corresponding to the self-aligning torque (SAT) generated by the tire lateral force. The self-aligning torque is a force with which the wheels try to return to a straight state (restorative force), generated by the road surface reaction force. Additionally, the steering reaction force characteristic is a lateral force-steering reaction force conversion map used in the SAT calculation unit 23, described later. The lateral force offset amount is offset in the same coding direction as the self-aligning torque more as the curvature of the road white line is increased. Then, the lateral force offset unit 22 outputs the calculation result to the subtractor 20a. The details of the lateral force offset unit 22 will be described later.

The subtractor 20a subtracts the calculation result output by the lateral force offset unit 22 (lateral force offset amount) from the calculation result output by the lateral force calculation unit 21 (tire lateral force). As a result, the subtractor 20a is able to offset the steering reaction force characteristic (lateral force-steering reaction force conversion map described later), representing the steering reaction force torque corresponding to the self-aligning torque generated by the tire lateral force, in the same coding direction as the self-aligning torque. Then, the subtractor 20a outputs the subtraction result (tire lateral force after offset) to the SAT calculation unit 23.

The SAT calculation unit 23 calculates the steering reaction force torque generated by the tire lateral force after offset, with reference to a lateral force-steering reaction force conversion map, based on the calculation result output by the subtractor 20a (tire lateral force after offset). That is, the SAT calculation unit 23 calculates the steering reaction force torque generated by the tire lateral force after offset, based on the tire lateral force after offset and the lateral force-steering reaction force conversion map. Then, the SAT calculation unit 23 outputs the calculation result (steering reaction force torque) to the adder 20b.

For example, the lateral force-steering reaction force conversion map is a map representing the relationship between the steering reaction force torque and the tire lateral force in a conventional steering device, which is calculated in advance by experiments or the like. That is, the lateral force-steering reaction force conversion map simulates the steering reaction force characteristic that represents the steering reaction force torque corresponding to the self-aligning torque generated by the tire lateral force in a conventional steering device. In the lateral force-steering reaction force conversion map, the steering reaction force torque is set to a larger value as the tire lateral force is increased. In addition, in the lateral force-steering reaction force conversion map, the change amount of the steering reaction force torque relative to the change amount of the tire lateral force is set larger when the tire lateral force is small, compared to when the tire lateral force is large. Furthermore, in the lateral force-steering reaction force conversion map, the steering reaction force torque is set to a smaller value as the vehicle speed is increased.

The adder 20b adds a steering reaction force torque component (spring item, viscous item, inertia item) corresponding to the steering characteristic to the calculation result output by the SAT calculation unit 23 (steering reaction force torque). The spring item is a component proportional to the steering angle and is calculated by multiplying a predetermined gain and the steering angle. The viscous item is a component proportional to the steering angular velocity and is calculated by multiplying a predetermined gain and the steering angular velocity. The inertia item is a component proportional to the steering angular acceleration and is calculated by multiplying a predetermined gain and the steering angular acceleration. Then, the adder 20b outputs the addition result (steering reaction force torque+ steering reaction force component) to the adder 20c.

The steering reaction force torque offset unit 24 calculates the steering reaction force offset amount, based on the detection results that are output by the turning angle sensor 2d, the vehicle speed sensor 7a, and the image processing unit 4a (turning angle, vehicle speed, image of the traveling path in front of the vehicle A). For example, the steering reaction force offset amount is an offset amount for offsetting the steering reaction force characteristic (lateral force-steering reaction force conversion map) in a direction in which the steering reaction force torque is increased. Here, when the vehicle speed is higher than a first threshold value (for example, when the vehicle speed is 60 km/h or more), the steering reaction force torque offset unit 24 offsets in a direction in which the steering reaction force torque is increased more, as the distance from the vehicle A to the road white line (lateral position), or the deviation margin time, is reduced, in accordance with the steering amount of the steering wheel 1a by the driver. Conversely, when the vehicle speed is lower than a second threshold value (for example, when the vehicle speed is 40 km/h or less), the offset will be in a direction in which the steering reaction force torque is increased more as the turning angle is increased. The first threshold value and the second threshold value are both reference values (setting values) that are set in advance. Here, the first threshold value and the second threshold value are assumed to be different values, but the values may be the same in practice. Then, the steering reaction force torque offset unit 24 outputs the calculation result to the adder 20c. The details of the steering reaction force torque offset unit 24 will be described later. The adder 20c adds the calculation result output by the steering reaction force torque offset unit 24 (steering reaction force offset amount) to the calculation result output by the adder 20b (steering reaction force torque+steering reaction force torque component). Then, the adder 20c outputs the addition result to the reaction force motor current driver 9a at the command steering reaction force torque.

Figure 8:
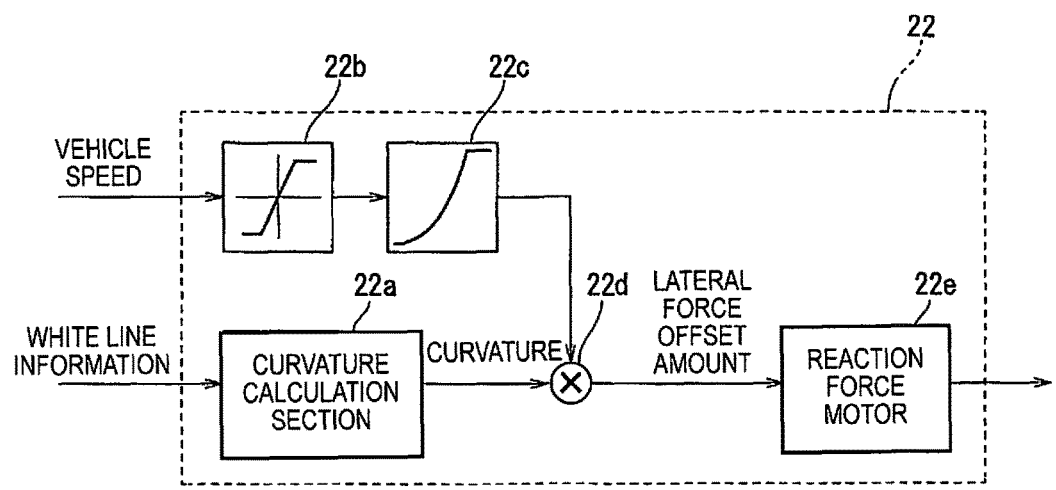
FIG. 8 is a block diagram illustrating a configuration example of a lateral force offset unit.

FIG. 8 is a block diagram illustrating a configuration example of the lateral force offset unit 22. The lateral force offset unit 22 comprises a curvature calculation section 22a, an upper and lower limiter 22b, a SAT gain calculation section 22c, a multiplier 22d, and a limiter processing section 22e, as illustrated in FIG. 8. The curvature calculation section 22a calculates the curvature of the road white line at the forward gazing point (curvature of the road white line at the position of the vehicle A after the set time (0.5 seconds)), based on the detection result that is output by the image processing unit 4a (white line information). Then, the curvature calculation section 22a outputs the calculation result to the multiplier 22d.

The upper and lower limiter 22b carries out upper and lower limiter processing on the detection result that is output by the vehicle speed sensor 7a (vehicle speed). For example, in the upper and lower limiter processing, the value is increased as the vehicle speed increases in the vehicle speed range of 0–V (>0), and becomes the maximum value when the vehicle speed is in the range of V or more. Then, the upper and lower limiter 22b outputs the vehicle speed after the upper and lower limiter processing to the SAT gain calculation section 22c. The SAT gain calculation section 22c calculates the SAT gain corresponding to the vehicle speed, based on the calculation result that is output by the upper and lower limiter 22b (vehicle speed after limiter processing). For example, the SAT gain corresponding to the vehicle speed is increased as the vehicle speed is increased in the vehicle speed region of 0-70 km/h, and becomes the maximum value when the vehicle speed is in the range of 70 km/h or more. In addition, in the SAT gain corresponding to the vehicle speed, the amount of change of the SAT gain relative to the amount of change of the vehicle speed becomes larger when the vehicle speed is high, compared to when the vehicle speed is low. Then, the SAT gain calculation section 22c outputs the calculation result to the multiplier 22d.

The multiplier 22d multiplies the calculation result that is output by the curvature calculation section 22a (curvature of the road white line at the forward gazing point) by the calculation result that is output by the SAT gain calculation section 22c (SAT gain corresponding to the vehicle speed). Then, the multiplier 22d outputs the multiplication result to the limiter processing section 22e as the lateral force offset amount. As a result, the multiplier 22d is able to increase the lateral force offset amount more as the curvature of the road white line at the forward gazing point is increased, that is, as the curvature radius of the road white line is decreased. The limiter processing section 22e limits the maximum value and the upper limit of the change rate of the calculation result that is output by the multiplier 22d (lateral force offset amount). The maximum value of the lateral force offset amount shall be 1000 N. In addition, the upper limit of the change rate of the lateral force offset amount shall be 600 N/s. Then, the limiter processing section 22e outputs the limited lateral force offset amount to the subtractor 20a.

Figure 9:
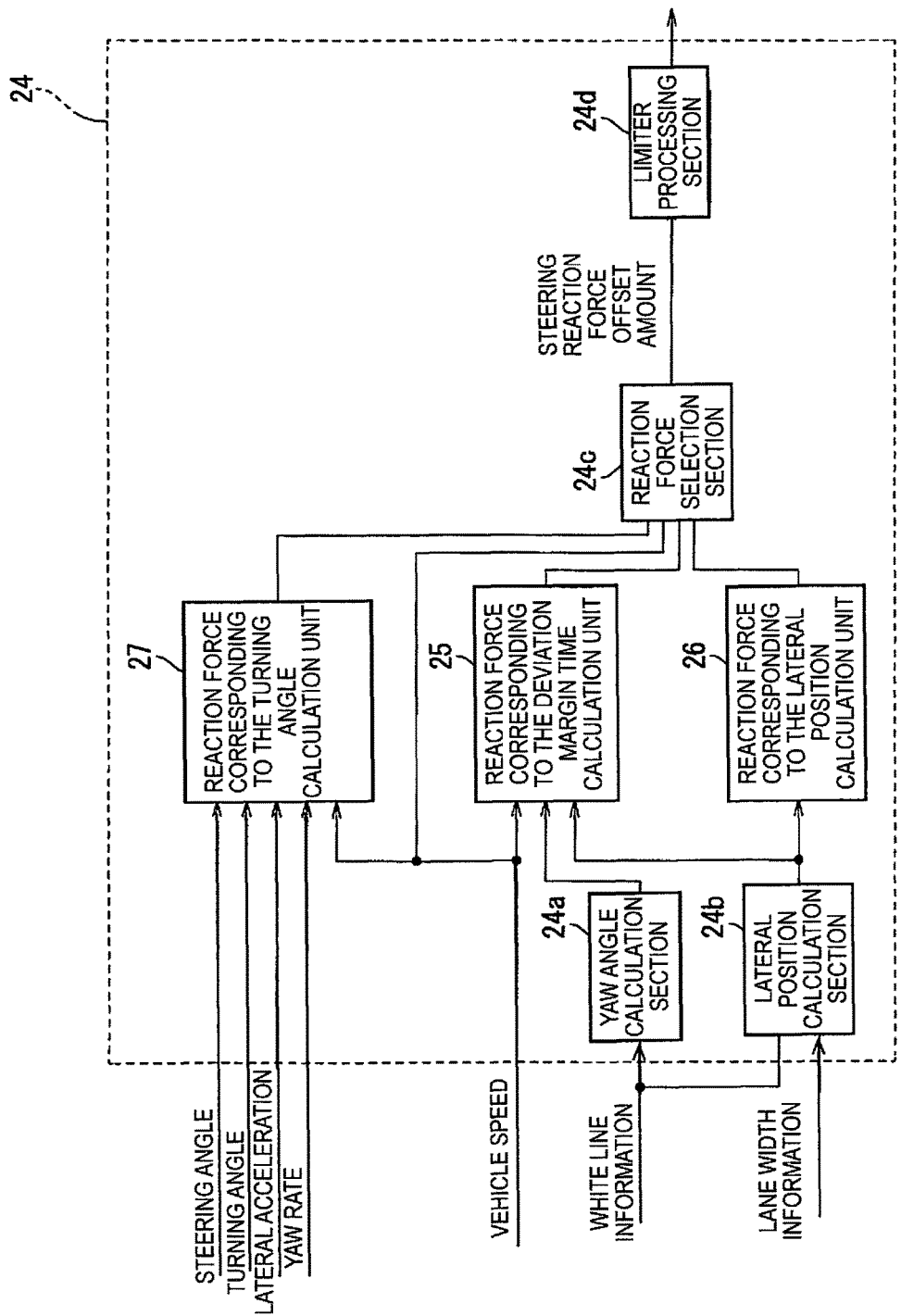
FIG. 9 is a block diagram illustrating a configuration example of a steering reaction force offset unit.

FIG. 9 is a block diagram illustrating a configuration example of the steering reaction force torque offset unit 24. The steering reaction force torque offset unit 24 comprises a yaw angle calculation section 24a, a lateral position calculation section 24b, a reaction force corresponding to the deviation margin time calculation unit 25, a reaction force corresponding to the lateral position calculation unit 26, a reaction force corresponding to the turning angle calculation unit 27, a reaction force selection section 24c, and a limiter processing section 24d, as illustrated in FIG. 9. The yaw angle calculation section 24a calculates the yaw angle at a forward gazing point (angle between the road white line and the traveling direction of the vehicle A), based on the detection result that is output by the image processing unit 4a (white line information). Then, the yaw angle calculation section 24a outputs the calculation result to the reaction force corresponding to the deviation margin time calculation unit 25. The lateral position calculation section 24b calculates the distance (lateral position) from the vehicle A to the road white line at the current position of the vehicle A (hereinafter also referred to as the lateral position at the current position), as well as the lateral position at the forward gazing point, based on the detection results that are output by the image processing unit 4a and the navigation system 17 (white line information, lane width information). Then, the lateral position calculation section 24b outputs the calculation result to the reaction force corresponding to the deviation margin time calculation unit 25 and the reaction force corresponding to the lateral position calculation unit 26.

The reaction force corresponding to the deviation margin time calculation unit 25 calculates the reaction force corresponding to the deviation margin time, based on the detection results that are output by the vehicle speed sensor 7a, the yaw angle calculation section 24a, and the lateral position calculation section 24*b*, and the like (vehicle speed, yaw angle at the forward gazing point, lateral position at the forward gazing point). An example of a reaction force corresponding to the deviation margin time is a reaction force that is increased as the deviation margin time is decreased. An example of a deviation margin time is the time required for the vehicle A to deviate from the traveling lane (margin time). Then, the reaction force corresponding to the deviation margin time calculation unit 25 outputs the calculation result to the reaction force selection section 24*c*. The details of the reaction force corresponding to the deviation margin time calculation section 25 will be described below.

The reaction force corresponding to the lateral position calculation unit 26 calculates the reaction force corresponding to the lateral position, based on the calculation result output by the lateral position calculation section 24*b* (lateral position at the current position). An example of a reaction force corresponding to the lateral position is a reaction force that is increased as the lateral position deviation is increased. An example of a lateral position deviation is the greater of the distance from the vehicle A to a target left lateral position and the distance from the vehicle A to a target right lateral position. Additionally, an example of a target left lateral position is a position 90 cm from the left road white line on the road center side. An example of a target right lateral position is a position 90 cm from the right road white line on the road center side. Then, the reaction force corresponding to the lateral position calculation unit 26 outputs the calculation result to the reaction force selection section 24*c*. The details of the reaction force corresponding to the lateral position calculation unit 26 will be described later. The reaction force corresponding to the turning angle calculation unit 27 calculates the reaction force corresponding to the turning angle, based on the detection results that are output by the turning angle sensor 2*d* and the vehicle speed sensor 7*a* (turning angle, vehicle speed). An example of a reaction force corresponding to the turning angle is a reaction force that is increased as the turning angle is increased. Then, the reaction force corresponding to the turning angle calculation unit 27 outputs the calculation result to the reaction force selection section 24*c*. The details of the reaction force corresponding to the turning angle calculation unit 27 will be described later.

The reaction force selection section 24*c* selects the optimum reaction force, based on the detection result that is output by the vehicle speed sensor 7*a* (vehicle speed), the calculation result that is output by the reaction force corresponding to the deviation margin time calculation unit 25 (reaction force corresponding to the deviation margin time), the calculation result output by the reaction force corresponding to the lateral position calculation unit 26 (reaction force corresponding to the lateral force), and the calculation result that is output by the reaction force corresponding to the turning angle calculation unit 27 (reaction force corresponding to the turning angle). For example, when the vehicle speed is higher than a first threshold value (for example, when the vehicle speed is 60 km/h or more), the reaction force selection section 24*c* selects whichever has the larger absolute value from the reaction force corresponding to the deviation margin time and the reaction force corresponding to the lateral position. Conversely, when the vehicle speed is lower than a second threshold value (for example, when the vehicle speed is 40 km/h or less), the reaction force corresponding to the turning angle is selected. Then, the reaction force selection section 24*c* outputs the selection result to the limiter processing section 24*d* as the steering reaction force offset amount. The limiter processing section 24*d* limits the maximum value and the upper limit of the change rate of the selection result output by the reaction force selection section 24*c* (steering reaction force offset amount). The maximum value of the steering reaction force offset amount shall be 2 Nm. In addition, the upper limit of the change rate of the steering reaction force offset amount shall be 10 Nm/s. Then, the limiter processing section 24*d* outputs the limited steering reaction force offset amount to the adder 20*c* (refer to FIG. 7).

Figure 10:
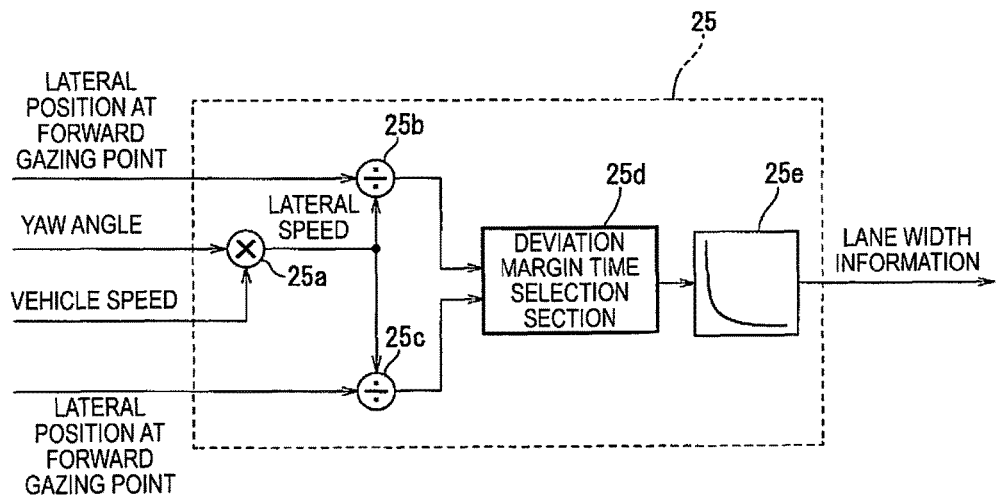
FIG. 10 is a block diagram illustrating a configuration example of a reaction force corresponding to the deviation margin time calculation unit.

FIG. 10 is a block diagram illustrating a configuration example of the reaction force corresponding to the deviation margin time calculation unit 25. The reaction force corresponding to the deviation margin time calculation unit 25 comprises a multiplier 25*a*, a divider 25*b*, a divider 25*c*, a deviation margin time selection section 25*d*, and a reaction force corresponding to the deviation margin time calculation section 25*e*, as illustrated in FIG. 10. The multiplier 25*a* multiplies the calculation result output by the yaw angle calculation section 24*a* (yaw angle) by the vehicle speed. Then, the multiplier 25*a* outputs the multiplication result (hereinafter also referred to as the lateral speed of the vehicle A) to the divider 25*b* and the divider 25*c*.

The divider 25*b* divides the distance from the vehicle A to the left road white line at the forward gazing point (lateral position with respect to the left road white line), from among the calculation result output by the lateral position calculation section 24*b* (lateral position at the current position), by the calculation result output by the multiplier 25*a* (lateral speed). Then, the divider 25*b* outputs the division result (hereinafter also referred to as the deviation margin time with respect to the left road white line) to the deviation margin time selection section 25*d*. The divider 25*c* divides the distance from the vehicle A to the right road white line at the forward gazing point (lateral position with respect to the right road white line), from among the calculation result output by the lateral position calculation section 24*b* (lateral position at the current position), by the calculation result output by the multiplier 25*a* (lateral speed). Then, the divider 25*c* outputs the division result (hereinafter also referred to as the deviation margin time with respect to the right road white line) to the deviation margin time selection section 25*d*.

The deviation margin time selection section 25*d* selects the shorter of the calculation result output by the divider 25*b* (deviation margin time with respect to the left road white line) and the calculation result output by the divider 25*c* (deviation margin time with respect to the right road white line). Then, the deviation margin time selection section 25*d* outputs the selection result (hereinafter also referred to as the deviation margin time) to the reaction force corresponding to the deviation margin time calculation section 25*e*. The reaction force corresponding to the deviation margin time calculation section 25*e* calculates the reaction force corresponding to the deviation margin time, based on the calculation result output by the deviation margin time selection section 25*d* (deviation margin time). The reaction force corresponding to the deviation margin time becomes the lowest value (for example, substantially zero) when the deviation margin time is in the range of 3 seconds or more, and increases as the deviation margin time is shorter (becomes a value inversely proportional to the deviation margin time), in the deviation margin time range of 0-3 seconds. Then, the reaction force corresponding to the deviation margin time calculation section 25*e* outputs the calculation result to the reaction force selection section 24*c* (refer to FIG. 9) as the reaction force corresponding to the deviation margin time. As a result, the reaction force corresponding to the deviation margin time is increased as the deviation margin time is reduced.

Figure 11:
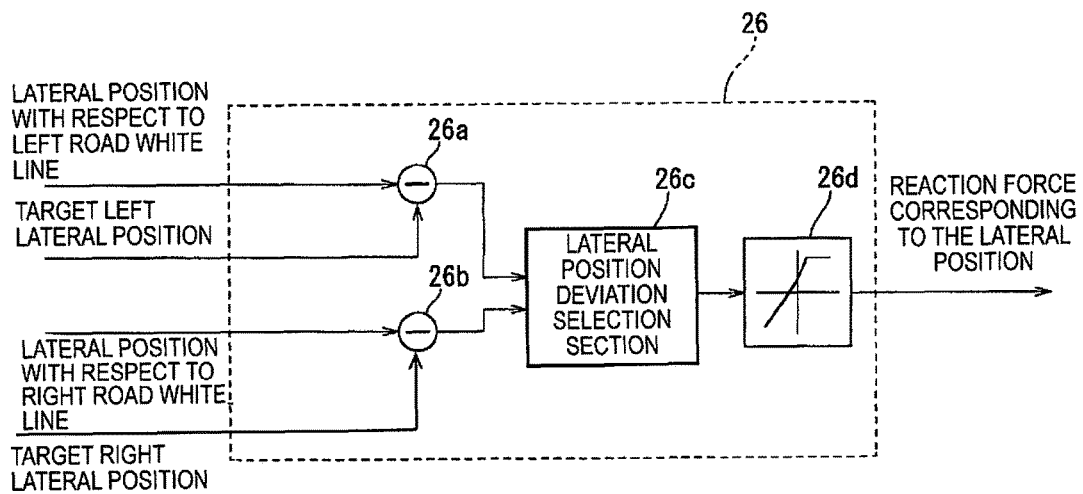
FIG. 11 is a block diagram illustrating a configuration example of a reaction force corresponding to the lateral position calculation unit.

FIG. 11 is a block diagram illustrating a configuration example of the reaction force corresponding to the lateral position calculation unit 26. The reaction force corresponding to the lateral position calculation unit 26 comprises a subtractor 26a, a subtractor 26b, a lateral position deviation selection section 26c, and a reaction force corresponding to the lateral position deviation calculation section 26d, as illustrated in FIG. 11. The subtractor 26a subtracts a predetermined target left lateral position (for example, 90 cm) from the calculation result output by the lateral position calculation section 24b (distance from the vehicle A to the left road white line at the current position of the vehicle A (lateral position with respect to the left road white line)). Then, the subtractor 26a outputs the subtraction result (hereinafter also referred to as the lateral position deviation with respect to the left road white line) to the lateral position deviation selection section 26c.

The subtractor 26b subtracts a predetermined target right lateral position (for example, 90 cm) from the calculation result output by the lateral position calculation section 24b (distance from the vehicle A to the right road white line at the current position of the vehicle A (lateral position with respect to the right road white line)). Then, the subtractor 26b outputs the subtraction result (hereinafter also referred to as the lateral position deviation with respect to the right road white line) to the lateral position deviation selection section 26c. The lateral position deviation selection section 26c selects the larger of the calculation result output by the subtractor 26a (lateral position deviation with respect to the left road white line) and the calculation result output by the subtractor 26b (lateral position deviation with respect to the right road white line). Then, the lateral position deviation selection section 26c outputs the selection result (hereinafter also referred to as the lateral position deviation) to the reaction force corresponding to the lateral position deviation calculation section 26d.

The reaction force corresponding to the lateral position deviation calculation section 26d calculates the reaction force corresponding to the lateral position, based on the calculation result output by the lateral position deviation selection section 26c (lateral position deviation). The reaction force corresponding to the lateral position is increased as the lateral position deviation is increased in the lateral position deviation range of less than a setting value, and becomes the maximum value when the lateral position deviation is in the range of a setting value or greater. Then, the reaction force corresponding to the lateral position deviation calculation section 26d outputs the calculation result to the reaction force selection section 24c (refer to FIG. 9) as the reaction force corresponding to the lateral position. As a result, the reaction force corresponding to the lateral position is increased as the lateral position deviation is increased.

Figure 12:
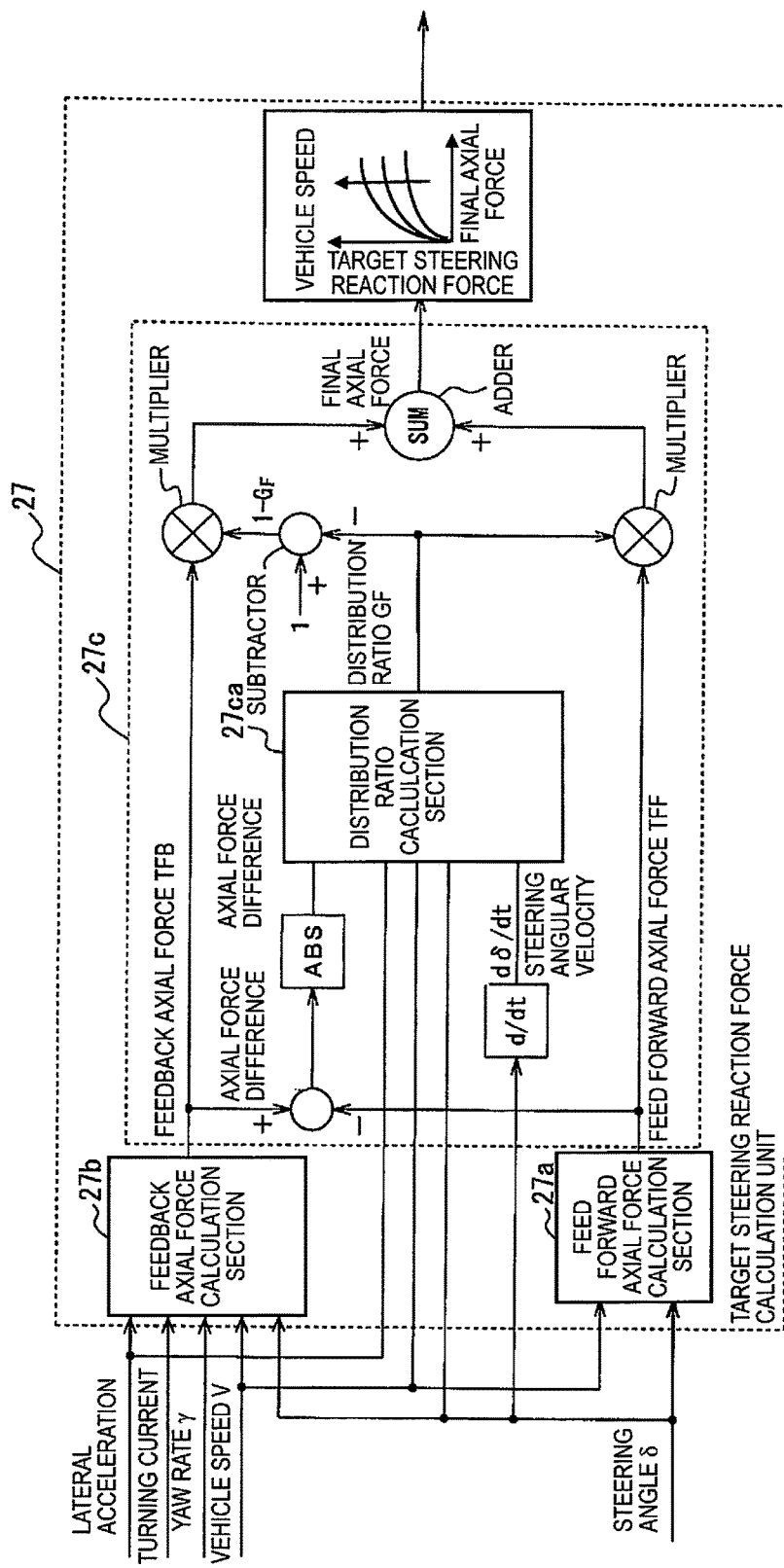
FIG. 12 is a block diagram illustrating a configuration example of a reaction force corresponding to the turning angle calculation unit.
Figure 13:
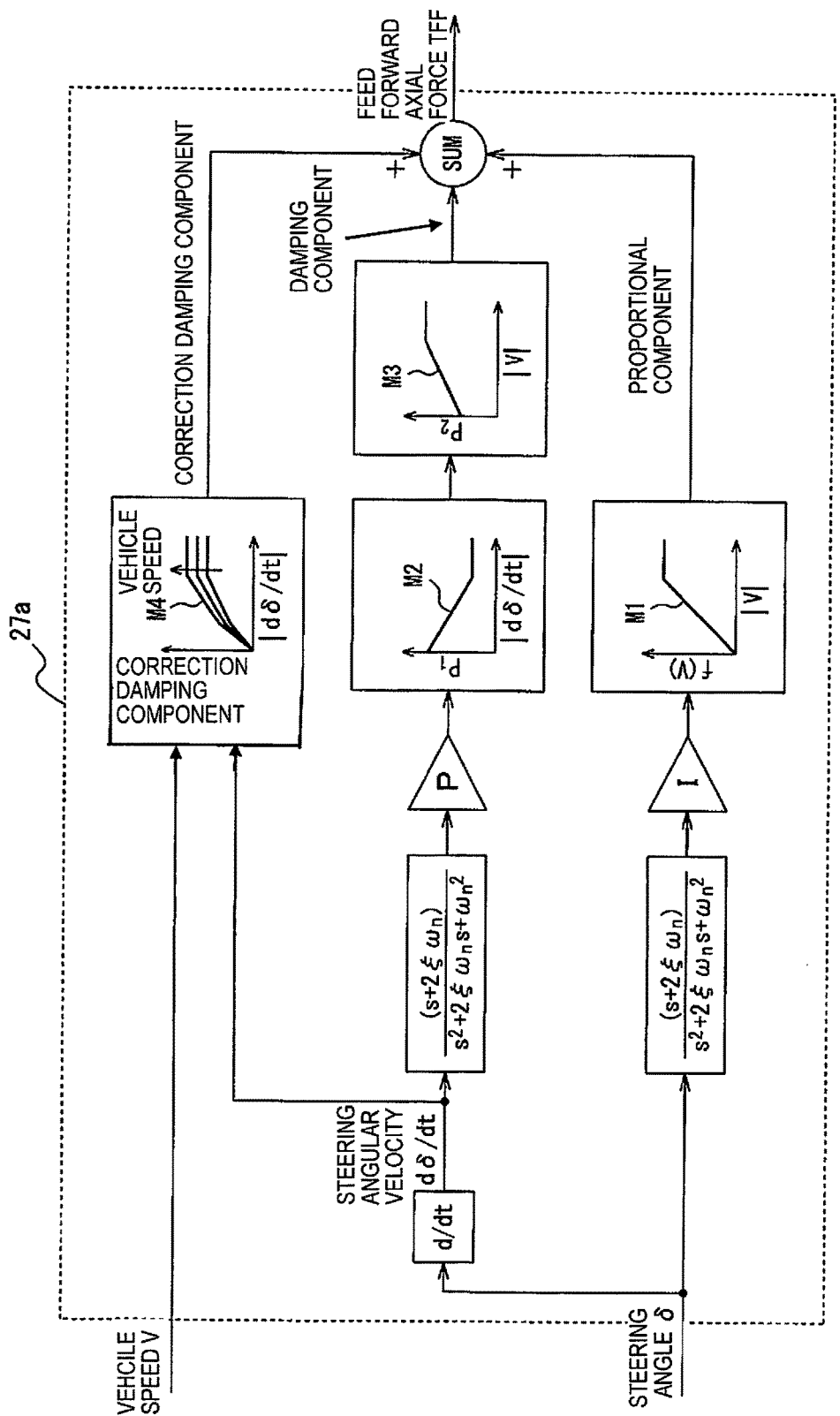
FIG. 13 is a block diagram illustrating a configuration example of a feed-forward axial force calculation section.

FIG. 12 is a block diagram illustrating a configuration example of the reaction force corresponding to the turning angle calculation unit 27. The reaction force corresponding to the turning angle calculation unit 27 comprises a feed-forward axial force calculation section 27a, a feedback axial force calculation section 27b, a final axial force calculation section 27c, and an axial force-steering reaction force conversion section 27d, as illustrated in FIG. 12. FIG. 13 is a block diagram illustrating a configuration of the feed-forward axial force calculation section 27a. The feed-forward axial force calculation section 27a calculates a feed-forward axial force $T_{FF}$, based on the steering angle δ detected by the steering angle sensor 1d, and the vehicle speed V detected by the vehicle speed sensor 7a, as illustrated in FIG. 13. Then, the feed-forward axial force calculation section 27a outputs the calculation result to the final axial force calculation section 27c.

The relational expression between a turning pinion angle θ and the pinion axial force Th is represented by the following formula (3), based on the motion equation of a vehicle equipped with a steering mechanism in which the steering wheel 1a and the left and right front wheels 5FL, 5FR are mechanically connected. An example of a turning pinion angle θ is the rotation angle of the pinion shaft 2a. An example of a rotation angle of the pinion shaft 2a is the multiplied value of the steering angle δ, and the variable gear ratio between the steering angle δ and the turning angle θ. Additionally, an example of the pinion axial force Th is the steering reaction force imparted to the steering wheel 1a. The first term on the right side of the following formula (3) is a damping term that represents a component based on the turning pinion angular velocity dθ/dt, from among the components that configure the pinion axial force Th. In addition, the second term on the right side is an inertia term that represents a component based on the turning pinion angular acceleration d2θ/dt2, from among the components that configure the pinion axial force Th. Furthermore, the third term on the right side is a proportional term that represents a component based on the tire lateral force Fd (turning pinion angle θ), from among the components that configure the pinion axial force Th.

$$Th = Ks(Jrs^2 + Cr \cdot s)/(Jr \cdot s^2 + (Cr + Cs)s + Ks) \cdot \theta + Cs(Jrs^3 + Cr \cdot s^2)/(Jr \cdot s^2 + (Cr + Cs)s + Ks) \cdot \theta + (Ks + Cs \cdot s)/(Jr \cdot s^2 + (Cr + Cs)s + Ks) \cdot Fd \quad (3)$$

However, Ks is the pinion stiffness, Cs is the pinion viscosity, Jr is the rack inertia, and Cr is the rack viscosity.

In addition, the formula (3) above, the second term on the right side, that is, the inertia term, contains many noise components, which induce vibration in the calculation result of the pinion axial force Th, and thus, is preferably excluded. Furthermore, the tire lateral force Fd may be represented as being dependent on the turning pinion angle θ and the vehicle speed V as Fd=f (V)·θ. An example of f (V) is a function that changes according to the vehicle speed V. Therefore, the formula (3) above can be expressed as the formula (4) below.

$$Th = Ks(Jrs^2 + Cr \cdot s)/(Jr \cdot s^2 + (Cr + Cs)s + Ks) \cdot \theta + (Ks + Cs \cdot s)/(Jr \cdot s^2 + (Cr + Cs)s + Ks) \cdot f(V) \cdot \theta \quad (4)$$

Here, an example of a method to set the variable f (V) that can be employed is a method to read the variable f (V) corresponding to the absolute value of the vehicle speed V from a control map M1. An example of a control map M1 is a map in which variables f (V) that correspond to the absolute values of the vehicle speed V are registered. Specifically, the control map M1 sets the variable f (V) to a first setting value (for example 0.0), when the absolute value of the vehicle speed V is zero. In addition, when the absolute value of the vehicle speed V is in the range of a first setting vehicle speed $V_1$ (>0) or greater, the variable f (V) is set to a second setting value (>first setting value. For example, 1.0) regardless of the magnitude of the vehicle speed V. Furthermore, when the absolute value of the vehicle speed V is in the range of equal to or greater than zero and less than the first setting vehicle speed $V_1$, the control map M1 increases the variable f (V) linearly, in accordance with the absolute value of the turning angular velocity dθ/dt. Specifically, when the absolute value of the vehicle speed V is in the range of equal to or greater than zero and less than the first setting vehicle speed $V_1$, the control map M1 sets the variable f (V) in accordance with a linear function representing the relationship between the absolute value of the vehicle speed V and the variable f (V). In the linear function, the variable f (V) is set to a first setting value (0.0) when the absolute value of the vehicle speed V is zero, and the variable f (V) is set to a second setting value (1.0) when the absolute value of the vehicle speed V is the first setting vehicle speed $V_1$. As a result, the feed-forward axial force calculation section 27a reduces (reduces) the absolute value of the proportional component as the absolute value of the vehicle speed V is reduced, when the absolute value of the vehicle speed V is less than the first setting vehicle speed $V_1$. In addition, the feed-forward axial force calculation section 27a does not reduce the absolute value of the proportional component regardless of the magnitude of the vehicle speed V, when the absolute value of the vehicle speed V is equal to or greater than the first setting vehicle speed $V_1$.

Additionally, the formula (4) above may be equivalently expressed as the following formula (5).

$$Th=P(s+2\cdot\zeta\cdot\omega n)s/(s^2+2\cdot\zeta\cdot\omega n\cdot s+\omega n^2)\delta+1\cdot(s+2\cdot\zeta\cdot\omega n)/(s^2+2\cdot\zeta\cdot n\cdot s+\omega n^2)\cdot f(V)\cdot\delta=P(s+2\cdot\zeta\cdot\omega n)/(s^2+2\cdot\zeta\cdot\omega n\cdot s+\omega n^2)\cdot f(V)\cdot\delta \quad (5)$$

However, P and I are control constants, $\zeta$ is a damping coefficient, and $\omega n$ is a natural vibration frequency. Examples of a method to set $\zeta$ and con that can be employed include a method to use a design value, or a method of identifying from experimentation results.

Accordingly, the pinion axial force Th, that is, the steering reaction force generated in the steering wheel 1a, can be expressed by the following formula (6), based on the formula (5) above.

$$Th=P(s+2\cdot\zeta\cdot\omega n)/(s^2+2\cdot\zeta\cdot\omega n\cdot s+\omega n^2)d\delta/dt+1\cdot(s+2\cdot\zeta\cdot\omega n)/(s^2+2\cdot\zeta\cdot\omega n\cdot s+\omega n^2)\cdot f(V)\cdot\delta \quad (6)$$

Then, as a calculation method for the feed-forward axial force $T_{FF}$, the following formula (7) is employed, based on formula (6) above, that is, the formula of the pinion axial force Th.

$$T_{FF}=P\cdot P_1\cdot P_2(s+2\cdot\zeta\cdot\omega n)/(s^2+2\cdot\zeta\cdot\omega n\cdot s+\omega n^2)d\delta/dt+1\cdot(s+2\cdot\zeta\cdot\omega n)/(s^2+2\cdot\zeta\cdot\omega n\cdot s+\omega n^2)\cdot f(V)\cdot\delta+\text{correction damping component}=\text{damping component}\cdot P_1\cdot P_2+\text{proportional component}+\text{correction damping component} \quad (7)$$

Here, the damping component is P $(s+2\cdot\zeta\cdot\omega n)/(s^2+2\cdot\zeta\cdot\omega n\cdot s+\omega n^2)$ $d\delta/dt$ and the proportional component is I·$(s+2\cdot\zeta\cdot\omega n)/(s^2+2\cdot\zeta\cdot\omega n\cdot s+\omega n^2)\cdot f$ (V)$\delta$. In addition, the correction damping component is a damping component based on the steering angular velocity $d\delta/dt$, and generates a steering reaction force in the opposite direction of the steering angular velocity $d\delta/dt$.

Here, an example of a method to set the gain $P_1$ that can be employed is a method to read a gain $P_1$ that corresponds to the absolute value of the steering angular velocity $d\delta/dt$ from a control map M2. An example of a control map M2 is a map in which gains $P_1$ that correspond to the absolute values of the steering angular velocity $d\delta/dt$ are registered. Specifically, the control map M2 sets the gain $P_1$ to a third setting value (for example 1.0), when the absolute value of the steering angular velocity $d\delta/dt$ is zero. In addition, when the absolute value of the steering angular velocity $d\delta/dt$ is in the range of a first setting steering angular velocity $d\delta_1/dt$ (>0) or greater, the gain $P_1$ is set to a fourth setting value (<third setting value. For example, 0.5) regardless of the magnitude of the steering angular velocity $d\delta/dt$. Furthermore, when the absolute value of the steering angular velocity $d\delta/dt$ is in the range of equal to or greater than zero and less than the first setting steering angular velocity $d\delta_1/dt$, the control map M2 decreases the gain $P_1$ linearly, in accordance with the absolute value of the steering angular velocity $d\delta/dt$. Specifically, when the absolute value of the steering angular velocity $d\delta/dt$ is in the range of equal to or greater than zero and less than the first setting steering angular velocity $d\delta_1/dt$, the control map M2 sets the gain $P_1$ in accordance with a linear function representing the relationship between the absolute value of the steering angular velocity $d\delta/dt$ and the gain $P_1$. In the linear function, the gain $P_1$ is set to a third setting value (1.0) when the steering angular velocity $d\delta/dt$ is zero, and the gain $P_1$ is set to a fourth setting value (0.5) when the absolute value of the steering angular velocity $d\delta/dt$ is the first setting steering angular velocity $d\delta_1/dt$. As a result, the feed-forward axial force calculation section 27a reduces (corrects) the absolute value of the damping component as the absolute value of the steering angular velocity $d\delta/dt$ is increased, when the absolute value of the steering angular velocity $d\delta/dt$ is less than the first setting steering angular velocity $d\delta_1/dt$. In addition, the feed-forward axial force calculation section 27a does not correct the absolute value of the damping component based on the gain $P_1$, regardless of the magnitude of the steering angular velocity $d\delta/dt$, when the absolute value of the steering angular velocity $d\delta/dt$ is equal to or greater than the first setting steering angular velocity $d\delta_1/dt$.

In a mechanical steering control device, the damping component included in the steering reaction force is saturated as the steering angular velocity $d\delta/dt$ is increased. Therefore, in a mechanical steering control device, the shape of the Lissajous figure composed of the steering angle δ and the steering reaction force becomes constant, regardless of the magnitude of the steering angular velocity $d\delta/dt$, by the damping component being saturated. However, in a steer-by-wire type of steering control device, which does not take into consideration the saturation of the damping component included in the steering reaction force, the steering reaction force continues to increase as the steering angular velocity $d\delta/dt$ is increased. In contrast, the reaction force corresponding to the turning angle calculation unit 27 reduces the absolute value of the damping component more as the absolute value of the steering angular velocity $d\delta/dt$ is increased. Therefore, the reaction force corresponding to the turning angle calculation unit 27 can suppress an increase in the absolute value of the damping component when the steering angular velocity $d\delta/dt$ is large. Accordingly, the reaction force corresponding to the turning angle calculation unit 27 can suppress the damping component from becoming excessive. As a result, the reaction force corresponding to the turning angle calculation unit 27 is able to impart a more appropriate steering feeling.

Additionally, an example of a method to set the gain $P_2$ that can be employed is a method to read a gain $P_2$ that corresponds to the absolute value of the vehicle speed V from a control map M3. An example of a control map M3 is a map in which gains $P_2$ that correspond to the absolute values of the vehicle speed V are registered. Specifically, the control map M3 sets the gain $P_2$ to a fifth setting value (for example 0.5), when the absolute value of the vehicle speed V is zero. In addition, when the absolute value of the vehicle speed V is in the range of a second setting vehicle speed $V_2$ (>0) or greater, the gain $P_2$ is set to a sixth setting value (>fifth setting value. For example, 1.0) regardless of the magnitude of the vehicle speed V. Furthermore, when the absolute value of the vehicle speed V is in the range of equal to or greater than zero and less than the second setting vehicle speed $V_2$, the control map M3 increases the gain $P_2$ linearly, in accordance with the absolute value of the vehicle speed V. Specifically, when the absolute value of the vehicle speed V is in the range of equal to or greater than zero and less than the second setting vehicle speed $V_2$, the control map M3 sets the gain $P_2$ in accordance with a linear function representing the relationship between the absolute value of the vehicle speed V and the gain $P_2$. In the linear function, the gain $P_2$ is set to a fifth setting value (0.5) when the absolute value of the vehicle speed V is zero, and the gain $P_2$ is set to a sixth setting value (1.0) when the absolute value of the vehicle speed V is the second setting vehicle speed $V_2$. As a result, the feed-forward axial force calculation section 27a reduces (corrects) the absolute value of the damping component as the absolute value of the vehicle speed V is reduced, when the absolute value of the vehicle speed V is less than the second setting vehicle speed $V_2$. In addition, the feed-forward axial force calculation section 27a does not correct the absolute value of the damping component based on gain $P_2$, regardless of the magnitude of the vehicle speed V, when the absolute value of the vehicle speed V is equal to or greater than the second setting vehicle speed $V_2$.

In this manner, the reaction force corresponding to the turning angle calculation unit 27 reduces the absolute value of the damping component as the absolute value of the vehicle speed V is reduced. Here, in a mechanical steering control device in which the steering wheel 1a and the left and right front wheels 5FL, 5FR are mechanically coupled, the tire lateral force Fd of the left and right front wheels 5FL, 5FR is reduced and the steering reaction force is reduced, when the vehicle speed V is reduced. In contrast, the reaction force corresponding to the turning angle calculation unit 27 is able to reduce the steering reaction force by reducing the absolute value of the damping component as the absolute value of the vehicle speed V is reduced. As a result, the reaction force corresponding to the turning angle calculation unit 27 is able to impart a more appropriate steering feeling.

Furthermore, an example of a method to set the correction damping component that can be employed is a method to read a correction damping component that corresponds to the absolute value of the steering angular velocity $d\delta/dt$ from a control map M4. An example of a control map M4 is a map in which correction damping components that correspond to the absolute values of the steering angular velocity $d\delta/dt$ are registered. Specifically, a control map M4 is set for each vehicle speed V. In each control map M4, the correction damping component is set to a seventh setting value (for example 0.0) when the steering angular velocity ($d\delta/dt$ is zero. In addition, when the absolute value of the steering angular velocity $d\delta/dt$ is in the range of a second setting steering angular velocity $d\delta_2/dt$ (>0) or greater, the control map M4 sets the correction damping component to an eighth setting value (constant value) regardless of the magnitude of the steering angular velocity $d\delta/dt$. Furthermore, when the steering angular velocity $d\delta/dt$ is equal to or greater than 0.0 and the absolute value of the steering angular velocity $d\delta/dt$ is in the range of less than a third setting steering angular velocity $d\delta_3/dt$ ($0<d\delta_3/dt<d\delta_2/dt$), the control map M4 increases the correction damping component linearly, in accordance with the absolute value of the steering angular velocity $d\delta/dt$. Specifically, when the absolute value of the steering angular velocity $d\delta/dt$ is in the range of equal to or greater than zero and less than the third setting steering angular velocity $d\delta_3/dt$, the control map M4 sets the correction damping component in accordance with a linear function representing the relationship between the absolute value of the steering angular velocity $d\delta/dt$ and the correction damping component. In the linear function, the correction damping component is set to a seventh setting value (0.0) when the absolute value of the steering angular velocity $d\delta/dt$ is zero, and the correction damping component is set to a ninth setting value (0<ninth setting value<eighth setting value) when the absolute value of the steering angular velocity $d\delta/dt$ is the third setting steering angular velocity $d\delta_3/dt$. In addition, when the absolute value of the steering angular velocity $d\delta/dt$ is in the range of equal to or greater than the third setting steering angular velocity $d\delta_3/dt$ and less than a second setting steering angular velocity $d\delta_2/dt$, the control map M4 increases the correction damping component linearly, in accordance with the absolute value of the steering angular velocity $d\delta/dt$. Specifically, when the absolute value of the steering angular velocity $d\delta/dt$ is in the range of equal to or greater than the third setting steering angular velocity $d\delta_3/dt$ and less than the second steering angular velocity $d\delta_2/dt$, the control map M4 sets the correction damping component in accordance with a linear function representing the relationship between the absolute value of the vehicle speed V and the correction damping component. In the linear function, the correction damping component is set to a ninth setting value when the absolute value of the steering angular velocity $d\delta/dt$ is the third setting steering angular velocity $d\delta_3/dt$, and the correction damping component is set to an eighth setting value when the absolute value of the steering angular velocity $d\delta/dt$ is the second setting steering angular velocity $d\delta_2/dt$. As a result, the feed-forward axial force calculation section 27a increases the absolute value of the correction damping component as the absolute value of the steering angular velocity $d\delta/dt$ is increased, when the absolute value of the steering angular velocity $d\delta/dt$ is less than the second setting steering angular velocity $d\delta_2/dt$. In addition, the feed-forward axial force calculation section 27a sets the absolute value of the correction damping component to a predetermined constant value regardless of the magnitude of the steering angular velocity $d\delta/dt$, when the absolute value of the steering angular velocity $d\delta/dt$ is equal to or greater than the second setting steering angular velocity $d\delta_2/dt$.

In this manner, the reaction force corresponding to the turning angle calculation unit 27 adds a correction damping component, whose absolute value is increased as the absolute value of the steering angular velocity $d\delta/dt$ is increased, to the feed-forward axial force $T_{FF}$. Therefore, the reaction force corresponding to the turning angle calculation unit 27 is able to increase the rise of the steering reaction force, when the absolute value of the steering angular velocity $d\delta/dt$ is increased at the start of turning of the steering wheel 1a. As a result, the reaction force corresponding to the turning angle calculation unit 27 is able to impart a more appropriate steering feeling. In addition, the reaction force corresponding to the turning angle calculation unit 27 sets a predetermined constant value as the correction damping component, when the absolute value of the steering angular velocity $d\delta/dt$ is equal to or greater than the second setting steering angular velocity $d\delta_2/dt$. Therefore, variation in the correction damping component can be suppressed when the absolute value of the steering angular velocity $d\delta/dt$ becomes equal to or greater than the second setting steering angular velocity $d\delta_2/dt$, due to the driver turning the steering wheel 1a. Accordingly, the reaction force corresponding to the turning angle calculation unit 27 is able to prevent the driver from feeling discomfort of the steering feeling, with the change in the steering reaction force caused by variation in the correction damping component not being perceived.

Figure 14:
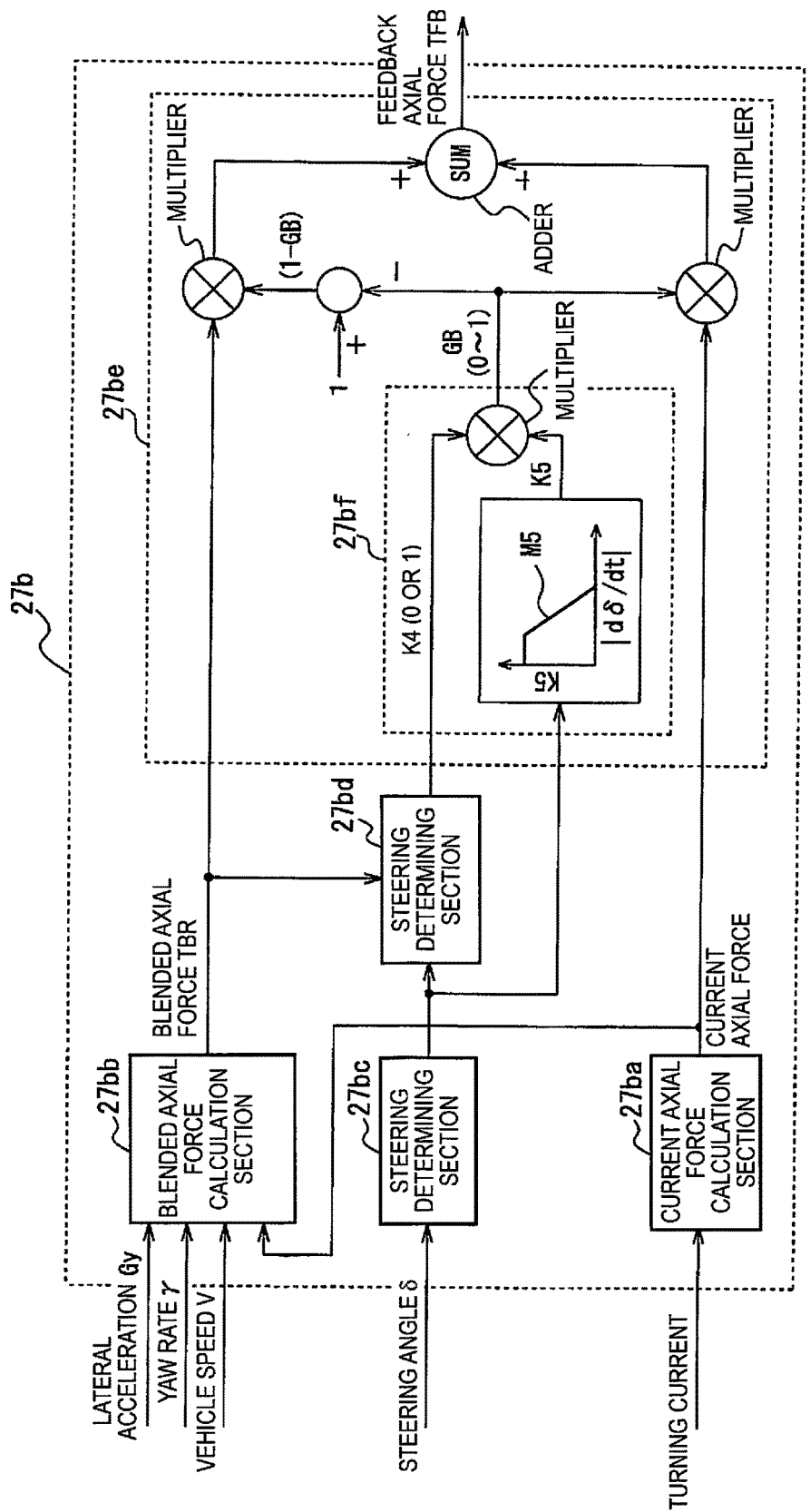
FIG. 14 is a block diagram illustrating a configuration example of a feedback axial force calculation section.

FIG. 14 is a block diagram illustrating a configuration example of the feedback axial force calculation section 27b. The feedback axial force calculation section 27b comprises a current axial force calculation section 27ba, a blended axial force calculation section 27bb, a steering angular velocity detecting section 27bc, a steering determining section 27bd, and a feedback axial force calculation execution section 27be, as illustrated in FIG. 14. The current axial force calculation section 27ba calculates a steering rack axial force according to the following formula (8), based on the detection result output by the turning angle sensor 2d (turning angle). In the following formula (8), a turning current indicating the turning angle, a torque constant [Nm/A] for calculating the output torque of the turning motor 2c based on the turning current, and a motor gear ratio for transmitting the motor torque of the turning motor 2c are multiplied. Subsequently, in the following formula (8), the multiplication result is divided by the pinion radius [m] of the pinion gear of the turning motor 2c, the division result is multiplied by the efficiency by which the output torque of the turning motor 2c is transmitted, and the multiplication result is calculated as a current axial force. Then, the current axial force calculation section 27ba outputs the calculation result to the blended axial force calculation section 27bb and the feedback axial force calculation section 27be.

$$\text{Current axial force} = (\text{turning current} \times \text{motor gear ratio} \times \text{torque constant (Nm/A)}/\text{pinion radius [m]}) \times \text{efficiency} \quad (8)$$

Here, the turning current is varied due to the steering wheel 1a being steered, which varies the target turning angle θ*, generating a difference between the target turning angle θ* and the actual turning angle θ. In addition, the turning current can also be varied due to the left and right front wheels 5FL, 5FR being turned, which causes a tire lateral force Fd to act on the left and right front wheels 5FL, 5FR, generating a difference between the target turning angle θ* and the actual turning angle θ. Furthermore, the turning current may also be varied due to road surface disturbance acting on the left and right front wheels 5FL, 5FR caused by unevenness of the road surface, or the like, which causes a tire lateral force Fd to act on the left and right front wheels 5FL, 5FR, generating a difference between the target turning angle θ* and the actual turning angle θ. Therefore, by being based on the turning current, the feedback axial force calculation section 27b is able to calculate the steering rack axial force (current axial force) that reflects the influence of the tire lateral force Fd that acts on the left and right front wheels 5FL, 5FR. Here, the current axial force is generated at the point in time in which a difference is generated between the target turning angle θ* and the actual turning angle θ. Accordingly, the phase of the current axial force is advanced, compared to the actual steering rack axial force and the lateral G axial force.

The blended axial force calculation section 27bb calculates a steering rack axial force (hereinafter also referred to as lateral G axial force) according to the following formula (9), based on a lateral acceleration Gy detected by the acceleration sensor 7b. In the following formula (9), first, the front wheel load and the lateral acceleration Gy are multiplied, and the multiplication result is calculated as the axial force (force in the axial direction) applied to the left and right front wheels 5FL, 5FR. Subsequently, in the following formula (9), the calculated axial force applied to the left and right front wheels 5FL, 5FR is multiplied by a constant corresponding to the suspension and angle of the link (hereinafter also referred to as link ratio), and the multiplication result is calculated as the lateral G axial force.

$$\text{Lateral } G \text{ axial force} = \text{axial force applied to the left and right front wheels } 5FL, 5FR \times \text{link ratio} \quad (9)$$

Axial force applied to the left and right front wheels 5FL, 5FR=front wheel load×lateral acceleration Gy Here, the lateral acceleration Gy is generated by the left and right front wheels 5FL, 5FR being turned, which causes a tire lateral force Fd to act on the left and right front wheels 5FL, 5FR, causing the vehicle A to turn. Therefore, by being based on the lateral acceleration Gy, the blended axial force calculation section 27bb is able to calculate the steering rack axial force (lateral G axial force) that reflects the influence of the tire lateral force Fd that acts on the left and right front wheels 5FL, 5FR. Here, since the acceleration sensor 7b is disposed on the spring (vehicle body), the detection of the lateral acceleration Gy is delayed. Consequently, the phase of the lateral G axial force is delayed, compared to the actual steering rack axial force. In the present embodiment, an example is shown in which a lateral acceleration Gy detected by the acceleration sensor 7b is used when calculating the lateral G axial force, but other configurations may be employed. For example, the configuration may be such that a yaw rate γ detected by the yaw rate sensor 7c is multiplied by the vehicle speed V detected by the vehicle speed sensor 7a, and the multiplication result γ×V is used instead of the lateral acceleration Gy.

In addition, the blended axial force calculation section 27bb calculates a steering rack axial force (hereinafter also referred to as yaw rate axial force) according to the following formula (10), based on the vehicle speed V detected by the vehicle speed sensor 7a and a yaw rate γ detected by the yaw rate sensor 7c. In the following formula (10), first, the front wheel load, the vehicle speed V, and the yaw rate γ are multiplied, and the multiplication result is calculated as the axial force that is applied to the left and right front wheels 5FL, 5FR. Subsequently, in the following formula (10), the calculated axial force applied to the left and right front wheels 5FL, 5FR is multiplied by the link ratio, and the multiplication result is calculated as the yaw rate axial force.

$$\text{Yaw rate axial force} = \text{axial force applied to the left and right front wheels } 5FL, 5FR \times \text{link ratio} \quad (10)$$

Axial force applied to the left and right front wheels 5FL, 5FR=front wheel load×yaw rate γ

Here, the yaw rate γ is generated by the left and right front wheels 5FL, 5FR being turned, which causes a tire lateral force Fd to act on the left and right front wheels 5FL, 5FR, causing the vehicle A to turn. Therefore, by being based on the yaw rate γ, the blended axial force calculation section 27bb is able to calculate the steering rack axial force (yaw rate axial force) that reflects the influence of the tire lateral force Fd that acts on the left and right front wheels 5FL, 5FR. Here, since the yaw rate sensor 7c is disposed on the spring (vehicle body), the detection of the yaw rate γ is delayed. Consequently, the phase of the yaw rate axial force is delayed, compared to the actual steering rack axial force.

Furthermore, the blended axial force calculation section 27bb reads the current axial force from the current axial force calculation section 27ba. Subsequently, the blended axial force calculation section 27bb calculates a steering rack axial force (hereinafter also referred to as "blended axial force") $T_{BR}$ according to the following formula (11), based on the current axial force that is read, and the calculated lateral G axial force and the yaw rate axial force. In the following formula (11), the lateral G axial force is multiplied by a distribution ratio K1, the current axial force is multiplied by a distribution ratio K2, the yaw rate axial force is multiplied by a distribution ratio K3, and the sum of these multiplication results are calculated as the blended axial force $T_{BR}$. That is, the blended axial force $T_{BR}$ is calculated based on a value obtained by multiplying the lateral G axial force by a distribution ratio K1, a value obtained by multiplying the current axial force by a distribution ratio K2, and a value obtained by multiplying the yaw rate axial force by a distribution ratio K3. Then, blended axial force calculation section 27bb outputs the calculation to the steering determining section 27bd and the feedback axial force calculation execution section 27be. Here, regarding the blended axial force $T_{BR}$, an axial force that directs the left and right front wheels 5FL, 5FR in the rightward direction shall be a positive value, and an axial force that directs the left and right front wheels 5FL, 5FR in the leftward direction shall be a negative value.

$$T_{BR}=\text{lateral } G \text{ axial force} \times K1 + \text{current axial force} \times K2 + \text{yaw rate axial force} \times K3 \qquad (11)$$

Here, the distribution ratios K1, K2, and K3 are distribution ratios of the lateral G axial force, the current axial force, and the yaw rate axial force. The magnitude relation of the distribution ratios K1, K2, and K3 is K1>K2>K3. That is, the distribution ratio is set to a larger value in the order of the lateral G axial force, the current axial force, and the yaw rate axial force. For example, the distribution ratios K1, K2, and K3 are respectively set to K1=0.6, K2=0.3, and K3=0.1. As a result, the blended axial force calculation section 27bb calculates the steering rack axial force that reflects the influence of the tire lateral force Fd that acts on the left and right front wheels 5FL, 5FR, as the blended axial force $T_{BR}$.

In this manner, the blended axial force calculation section 27bb calculates the blended axial force $T_{BR}$ based on a value obtained by multiplying the current axial force by the distribution ratio K2 and a value obtained by multiplying the lateral G axial force by the distribution ratio K1. Here, the phase of the lateral G axial force is delayed, compared to the actual steering rack axial force. Additionally, the phase of the current axial force is advanced, compared to the actual steering rack axial force. Therefore, by adding the current axial force to the lateral G axial force, the blended axial force calculation section 27bb is able to compensate for the delay in the phase caused by the lateral G axial force, and is able to calculate a more appropriate blended axial force $T_{BR}$. Accordingly, the SBW controller 4 is able to impart a more appropriate steering reaction force, by driving the reaction force motor 1c based on the blended axial force $T_{BR}$.

In addition, the blended axial force calculation section 27bb calculates the blended axial force $T_{BR}$ based on a value obtained by multiplying the current axial force by the distribution ratio K2 and a value obtained by multiplying the lateral G axial force by the distribution ratio K1. Here, in the vehicle A, when road surface disturbance acts on the left and right front wheels 5FL, 5FR caused by unevenness of the road surface, or the like, and causes a tire lateral force Fd to act on the left and right front wheels 5FL, 5FR, a difference is generated between the target turning angle θ* and the actual turning angle θ. Therefore, by adding the current axial force to the lateral G axial force, the blended axial force calculation section 27bb is able to reflect the influence of road surface disturbance that acts on the left and right front wheels 5FL, 5FR on the blended axial force $T_{BR}$, and is able to calculate a more appropriate blended axial force $T_{BR}$. Accordingly, the SBW controller 4 is able to impart a more appropriate steering reaction force, by driving the reaction force motor 1c based on the blended axial force $T_{BR}$.

Furthermore, the blended axial force calculation section 27bb sets the distribution ratio K1 of the lateral G axial force larger than the distribution ratio K2 of the current axial force. Therefore, the blended axial force calculation section 27bb is able to reduce the distribution ratio of the current axial force, and is able to suppress a decrease in the inference accuracy of the blended axial force $T_{BR}$, even if, for example, the inference accuracy of the current axial force is decreased due to the influence of friction or inertia of the turning motor 2c. Accordingly, the SBW controller 4 is able to impart a more appropriate steering reaction force, by driving the reaction force motor 1c based on the blended axial force $T_{BR}$.

In addition, the blended axial force calculation section 27bb calculates a feedback axial force $T_{FB}$ based on a value obtained by multiplying the current axial force by the distribution ratio K2, a value obtained by multiplying the lateral G axial force by the distribution ratio K1, and a value obtained by multiplying the yaw rate axial force by the distribution ratio K3. Here, for example, when the vehicle A is in a spinning state, the turning current and the lateral acceleration Gy are increased; therefore, both the detection result of the acceleration sensor 7b and the detection result of the turning current detection section 8B become maximum values (saturation values). In contrast, while the yaw rate γ also increases, the increase amount of the yaw rate γ is relatively small compared to the increase amount of the turning current and the lateral acceleration Gy; therefore, the detection result of the yaw rate sensor 7c does not reach the maximum value (saturation value). Accordingly, the detection result of the yaw rate sensor 7c varies according to the degree of the spinning state of the vehicle A. Therefore, the blended axial force $T_{BR}$ can be varied according to the degree of the spinning state of the vehicle A. As a result, the SBW controller 4 is able to impart a more appropriate steering reaction force, by driving the reaction force motor 1c based on the blended axial force $T_{BR}$.

The steering angular velocity detecting section 27bc calculates the steering angular velocity dδ/dt of the steering wheel 1a, based on the steering angle δ detected by the steering angle sensor 1d. Then, the steering angular velocity detecting section 27bc outputs the calculation result to the blended axial force calculation section 27bb and the steering determining section 27bd. Here, regarding the steering angular velocity dδ/dt, an angular velocity when the steering wheel 1a is rotated clockwise shall be a positive value, and an angular velocity when rotating counterclockwise shall be a negative value.

The steering determining section 27bd determines whether or not the driver is carrying out a steering increase operation or a turn-back operation of the steering wheel 1a, based on the blended axial force $T_{BR}$ calculated by the blended axial force calculation section 27bb and the steering angular velocity dδ/dt detected by the steering angular velocity detecting section 27bc. An example of a steering increase operation is a steering operation in a direction in which the steering wheel 1a (steering angle δ) moves away from the neutral position. In addition, an example of turn-back operation is a steering operation in a direction in which the steering wheel 1a (steering angle δ) approaches the neutral position. Specifically, the steering determining section 27bd determines that a steering increase operation of the steering wheel 1a is being carried out when the blended axial force $T_{BR}$ is a positive value and the steering angular velocity dδ/dt is a positive value, or, when the blended axial force $T_{BR}$ is a negative value and the steering angular velocity dδ/dt is a negative value, and sets the variable K4 to 1.0. The variable K4 is a flag indicating which of a steering increase operation or a turn-back operation of the steering wheel 1a is being carried out. The variable K4 is set to 1.0 when a steering increase operation of the steering wheel 1a is being carried out, and is set to 0.0 when a turn-back operation is being carried out. Furthermore, the steering determining section 27bd determines that a steering increase operation of the steering wheel 1a is not being carried out when the blended axial force $T_{BR}$ is a positive value and the steering angular velocity dδ/dt is a negative value, or, when the blended axial force $T_{BR}$ is a negative value and the steering angular velocity dδ/dt is a positive value, and sets the variable K4 to zero. Then, the steering determining section 27bd outputs the set variable K4 to the feedback axial force calculation execution section 27be.

The feedback axial force calculation execution section 27be reads the current axial force, the blended axial force $T_{BR}$, the steering angular velocity dδ/dt, and the variable K4 from the current axial force calculation section 27ba, the blended axial force calculation section 27bb, the steering angular velocity detecting section 27bc, and the steering determining section 27bd. Subsequently, the feedback axial force calculation execution section 27be calculates a steering rack axial force (hereinafter also referred to as feedback axial force $T_{FB}$) according to the following formula (12), based on the current axial force, the blended axial force $T_{BR}$, the steering angular velocity dδ/dt, and the variable K4, which are read. Then, the feedback axial force calculation execution section 27be outputs the calculation result to the final axial force calculation section 27c.

$$\text{Feedback axial force } T_{FB}=\text{current axial force} \times GB+ \text{blended axial force } T_{BR} \times (1-GB) \quad (12)$$

Here, GB is a numerical value (hereinafter also referred to as the distribution ratio) representing the distribution ratio GB of the current axial force and the distribution ratio (1−GB) of the blended axial force $T_{BR}$. As a result, based on the distribution ratio GB, the feedback axial force calculation execution section 27be calculates the feedback axial force $T_{FB}$ by combining the current axial force and the blended axial force $T_{BR}$ at a ratio of GB:(1−GB). Here, an example of a method to set the distribution ratio GB that can be employed is a method to set the distribution ratio GB by a distribution ratio setting section 27bf, based on the determination result output by the steering determining section 27bd. The distribution ratio setting section 27bf reads the steering angular velocity dδ/dt and the variable K4 from the steering determining section 27bd. Subsequently, the distribution ratio setting section 27bf calculates the distribution ratio GB according to the following formula (13), based on the steering angular velocity dδ/dt and the variable K4 that are read.

$$GB=K4 \times K5 \quad (13)$$

Here, K5 is a numerical value representing the distribution ratio GB of the current axial force and the distribution ratio (1−GB) of the blended axial force $T_{BR}$ when K4 is 1.0, that is, at the time of a steering increase operation of the steering wheel 1a. As a result, during a steering increase operation of the steering wheel 1a, the feedback axial force calculation execution section 27be calculates the feedback axial force $T_{FB}$ based on the variable K5, by combining the current axial force and the blended axial force $T_{BR}$ at a ratio of K5:(1−K5). When K4 is 0.0, that is, at the time of a turn-back operation of the steering wheel 1a, the blended axial force $T_{BR}$ is set as the feedback axial force $T_{FB}$, regardless of the variable K5. Here, an example of a method to set the variable K5 that can be employed is a method to read variable K5 that corresponds to the steering angular velocity dδ/dt from a control map M5. An example of a control map M5 is a map in which variables K5 that correspond to the steering angular velocity dδ/dt are registered.

When the absolute value of the steering angular velocity dδ/dt is in the range of equal to or greater than zero and less than a fourth setting steering angular velocity $d\delta_4$/dt (>0), the control map M5 sets the variable K5 to a tenth setting value (for example 1.0), regardless of the magnitude of the steering angular velocity dδ/dt. In addition, when the absolute value of the steering angular velocity dδ/dt is in the range of a fifth setting steering angular velocity $d\delta_5$/dt (>$d\delta_4$/dt) or greater, the variable K5 is set to an eleventh setting value (<tenth setting value. For example, 0.0) regardless of the magnitude of the steering angular velocity dδ/dt. Furthermore, when the absolute value of the steering angular velocity dδ/dt is in the range of equal to or greater than the fourth setting steering angular velocity $d\delta_4$/dt and less than a fifth setting steering angular velocity $d\delta_5$/dt, the control map M5 reduces the variable K5 linearly, in accordance with the absolute value of the steering angular velocity dδ/dt. Specifically, when the absolute value of the steering angular velocity dδ/dt is in the range of equal to or greater than the fourth setting steering angular velocity $d\delta_4$/dt and less than the fifth setting steering angular velocity $d\delta_5$/dt, the control map M5 sets the variable K5 in accordance with a linear function representing the relationship between the absolute value of the steering angular velocity dδ/dt and the variable K5. In the linear function, the variable K5 is set to a tenth setting value (1.0) when the absolute value of the steering angular velocity dδ/dt is the fourth setting steering angular velocity $d\delta_4$/dt, and the variable K5 is set to an eleventh setting value (0.0) when the absolute value of the steering angular velocity dδ/dt is the fifth setting steering angular velocity $d\delta_5$/dt. As a result, the distribution ratio setting section 27bf sets the distribution ratio GB to 1.0, when the variable K4 is 1.0 (at the time of a steering increase operation) and the absolute value of the steering angular velocity dδ/dt is less than the fourth setting steering angular velocity $d\delta_4$/dt (at the time of low-speed turning). Then, the feedback axial force calculation execution section 27be sets the current axial force as the feedback axial force $T_{FB}$. In addition, the distribution ratio setting section 27bf sets the distribution ratio GB to 0.0, when the variable K4 is 1.0 (at the time of a steering increase operation) and the absolute value of the steering angular velocity dδ/dt is equal to or greater than the fifth setting steering angular velocity $d\delta_5$/dt (at the time of high-speed turning). Accordingly, the feedback axial force calculation execution section 27be sets the blended axial force $T_{BR}$ as the feedback axial force $T_{FB}$. In addition, the distribution ratio setting section 27bf sets the variable K5 as the distribution ratio GB, when the variable K4 is 1.0 (at the time of a steering increase operation), and the absolute value of the steering angular velocity dδ/dt is equal to or greater than the fourth setting steering angular velocity $d\delta_4$/dt and less than the fifth setting steering angular velocity $d\delta_5$/dt (at the time of medium-speed turning). As a result, the feedback axial force calculation execution section 27be sets the combination of a value obtained by multiplying the current axial force by the variable K5 and a value obtained by multiplying the blended axial force $T_{BR}$ by (1−K5) as the feedback axial force $T_{FB}$. On the other hand, the distribution ratio setting section 27bf sets 0.0 as the distribution ratio GB regardless of the steering angular velocity dδ/dt, when the variable K4 is 0.0 (at the time of a turn-back operation). Then, the feedback axial force calculation execution section 27be sets the blended axial force $T_{BR}$ as the feedback axial force $T_{FB}$.

In this manner, when a steering increase operation of the steering wheel 1a is carried out, the feedback axial force calculation execution section 27be sets the current axial force as the feedback axial force $T_{FB}$ if the absolute value of the steering angular velocity dδ/dt is less than the fourth setting steering angular velocity $dδ_4$/dt. Here, in a mechanical steering control device in which the steering wheel 1a and the left and right front wheels 5FL, 5FR are mechanically coupled, at the time of a steering increase operation of the steering wheel 1a, a steering reaction force for returning the steering wheel 1a to the neutral position is generated by friction and the tire lateral force Fd that accompany the turning of the left and right front wheels 5FL, 5FR. Additionally, in the feedback axial force calculation execution section 27be, at the time of a steering increase operation of the steering wheel 1a, the current axial force becomes equal to the sum value of the tire lateral force Fd and the friction. Accordingly, by setting the current axial force as the feedback axial force $T_{FB}$, the SBW controller 4 is able to impart a steering reaction force for returning the steering wheel 1a to the neutral position, in the same manner as a mechanical steering control device. As a result, the SBW controller 4 is able to impart a more appropriate steering reaction force at the time of a steering increase operation of the steering wheel 1a. Incidentally, the blended axial force $T_{BR}$ does not include elements of friction that accompany the turning of the left and right front wheels 5FL, 5FR. Therefore, for example, in a method where the blended axial force $T_{BR}$ is set as the feedback axial force $T_{FB}$ at the time of a steering increase operation of the steering wheel 1a, there is the possibility that discomfort is imparted to the steering feeling.

In addition, when a turn-back operation of the steering wheel 1a is carried out, the feedback axial force calculation execution section 27be sets the blended axial force $T_{BR}$, in which the current axial force and the lateral G axial force are distributed according to a predetermined distribution ratio, as the feedback axial force $T_{FB}$ regardless of the magnitude of the absolute value of the steering angular velocity dδ/dt. Here, in a mechanical steering control device in which the steering wheel 1a and the left and right front wheels 5FL, 5FR are mechanically coupled, at the time of a turn-back operation of the steering wheel 1a, a steering reaction force for returning the steering wheel 1a to the neutral position is generated by the tire lateral force Fd that accompanies the turning of the left and right front wheels 5FL, 5FR. Therefore, in a mechanical steering control device, the driver returns the steering wheel 1a to the neutral position to return the left and right front wheels 5FL, 5FR to the neutral position at the time of a turn-back operation of the steering wheel 1a, by reducing the holding force of the steering wheel 1a and sliding the steering wheel 1a on the palm of the hand. In contrast, in the feedback axial force calculation execution section 27be, even if the turning current is reduced and the current axial force is reduced, it is possible to suppress a reduction in the steering reaction force for returning the steering wheel 1a to the neutral position, by setting the blended axial force $T_{BR}$ as the feedback axial force $T_{FB}$. Therefore, the feedback axial force calculation execution section 27be is able return the steering wheel 1a to the neutral position by the driver reducing the holding force of the steering wheel 1a and sliding the steering wheel 1a on the palm of the hand, in the same manner as a mechanical steering control device. As a result, the SBW controller 4 is able to impart a more appropriate steering reaction force at the time of a turn-back operation of the steering wheel 1a.

Furthermore, when it is determined that a steering increase operation of the steering wheel 1a is being carried out, and that the absolute value of the steering angular velocity dδ/dt is equal to or greater than the fourth setting steering angular velocity $dδ_4$/dt, the feedback axial force calculation execution section 27be sets the feedback axial force $T_{FB}$ by distributing the current axial force and the blended axial force $T_{BR}$, and increases the distribution ratio of the current axial force as the absolute value of the steering angular velocity dδ/dt is reduced. Therefore, for example, during a turn-back operation of the steering wheel 1a, if the steering angle δ straddles the neutral position and a steering increase operation of the steering wheel 1a is continuously carried out in the same direction, the feedback axial force calculation execution section 27be is able to gradually transition the feedback axial force $T_{FB}$ from the blended axial force $T_{BR}$ to the current axial force, as the absolute value of the steering angular velocity dδ/dt is gradually reduced during the steering increase operation. As a result, the SBW controller 4 is able to impart a more appropriate steering reaction force.

Returning to FIG. 12, the final axial force calculation section 27c reads the steering angle δ, the vehicle speed V, the lateral acceleration Gy, the feed-forward axial force $T_{FF}$, and the feedback axial force $T_{FB}$, from the steering angle sensor 1d, the vehicle speed sensor 7a, the acceleration sensor 7b, the feed-forward axial force calculation section 27a, and the feedback axial force calculation section 27b. Subsequently, the final axial force calculation section 27c calculates the steering angular velocity dδ/dt of the steering wheel 1a, based on the steering angle δ that is read. Subsequently, the final axial force calculation section 27c calculates a steering rack axial force (hereinafter also referred to as final axial force) according to the following formula (14), based on the steering angle δ, the vehicle speed V, the lateral acceleration Gy, the feed-forward axial force $T_{FF}$, and the feedback axial force $T_{FB}$, which are read, and the calculated steering angular velocity dδ/dt. Then, the final axial force calculation section 27c outputs the calculation result to the axial force-steering reaction force conversion section 27d.

$$\text{Final axial force} = \text{feed-forward axial force } T_{FF} \times GF + \text{feedback axial force } T_{FB} \times (1-GF) \quad (14)$$

Here, GF is a numerical value (hereinafter referred to as distribution ratio) that represents the distribution ratio GF of the feed-forward axial force $T_{FF}$ and the distribution ratio (1−GF) of the feedback axial force $T_{FB}$. As a result, the final axial force calculation section 27c calculates the final axial force by combining the feed-forward axial force $T_{FF}$ and the feedback axial force $T_{FB}$ at a ratio of GF:(1−GF), based on the distribution ratio GF. In this manner, the final axial force calculation section 27c calculates the final axial force based on the feedback axial force $T_{FB}$ and the feed-forward axial force $T_{FF}$. Here, since the feedback axial force $T_{FB}$ reflects the influence of the tire lateral force Fd that acts on the left and right front wheels 5FL, 5FR, the feedback axial force changes according to changes in the road surface state and changes in the vehicle state. In contrast, since the feed-forward axial force $T_{FF}$ does not reflect the influence of the tire lateral force Fd, the feed-forward axial force changes smoothly regardless of changes in the road surface state, and the like. Therefore, the final axial force calculation section 27c is able to calculate a more appropriate final axial force by calculating the final axial force based on the feed-forward axial force $T_{FF}$ in addition to the feedback axial force $T_{FB}$.

The final axial force calculation section 27c comprises a distribution ratio calculation section 27ca. The distribution ratio calculation section 27ca sets the distribution ratio GF based on a distribution ratio $GF_1$ based on an axial force difference, a distribution ratio $GF_2$ based on the lateral acceleration Gy, a distribution ratio $GF_3$ based on the vehicle speed V and the steering angle δ, and a distribution ratio $GF_4$ based on the steering angular velocity dδ/dt. An example of the axial force difference that can be employed is the difference between the feed-forward axial force $T_{FF}$ and the feedback axial force $T_{FB}$. Specifically, the axial force difference is set to the subtraction result obtained by subtracting the feedback axial force $T_{FB}$ from the feed-forward axial force $T_{FF}$. In addition, a method of setting the distribution ratio GF that can be employed is a method in which the smaller value of the distribution ratio $GF_1$ based on an axial force difference and the distribution ratio $GF_2$ based on the lateral acceleration Gy, the distribution ratio $GF_3$ based on the vehicle speed V and the steering angle δ, and the distribution ratio $GF_4$ based on the steering angular velocity dδ/dt are multiplied, and the multiplication result is set as the distribution ratio GF.

Returning to FIG. 12, the axial force-steering reaction force conversion section 27d calculates a target steering reaction force based on the final axial force calculated by the final axial force calculation section 27c. The target steering reaction force is the target value of the steering reaction force. An example of a method to calculate the target steering reaction force that can be employed is a method to read a target steering reaction force corresponding to the vehicle speed V and the final axial force from a control map M6. An example of a control map M6 is a map in which a target steering reaction force that corresponds to the final axial force is registered for each vehicle speed V. A control map M6 is set for each vehicle speed V. In addition, the control map M6 sets the target steering reaction force to a larger value as the final axial force is increased. Then, the axial force-steering reaction force conversion section 27d outputs the calculation result to the reaction force selection section 24c (refer to FIG. 9) as the reaction force corresponding to the turning angle. As a result, the reaction force corresponding to the turning angle is increased as the turning angle is increased.

Figure 15:
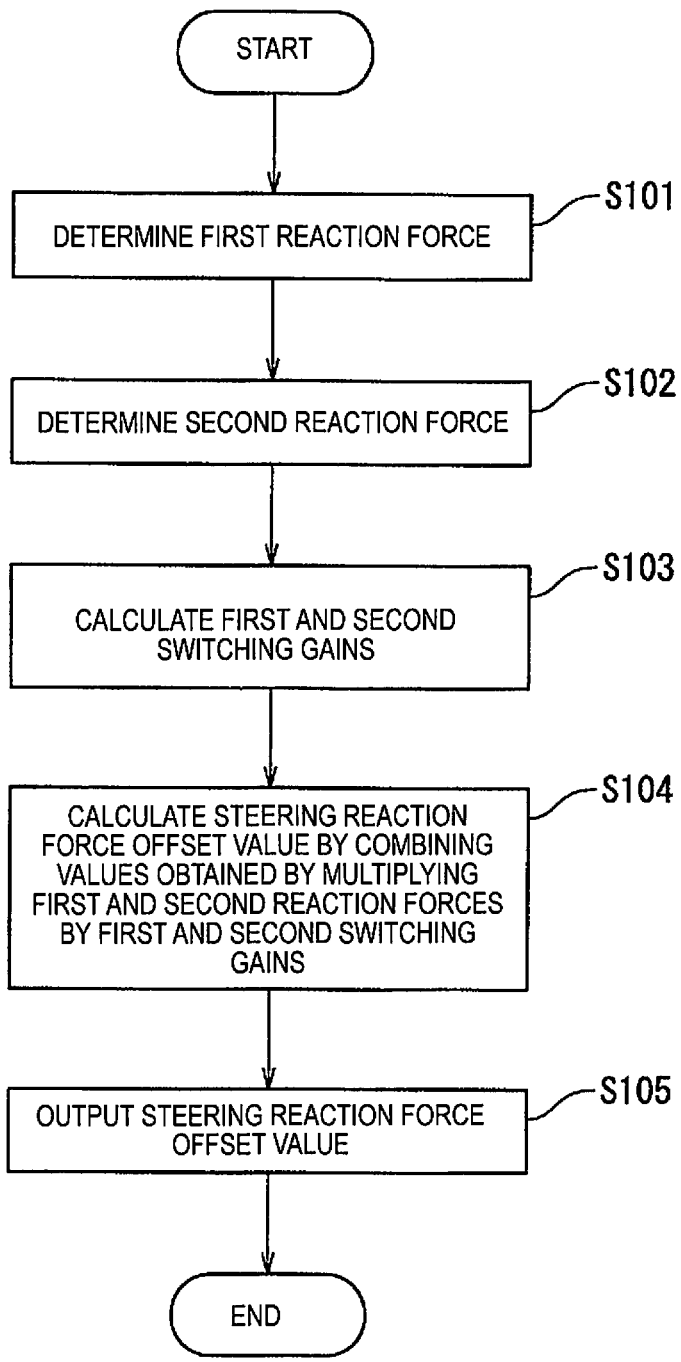
FIG. 15 is a flowchart relating to processing in the reaction force selection section 24c.

FIG. 15 is a flowchart relating to a processing in the reaction force selection section 24c. The reaction force selection section 24c selects whichever has the larger absolute value from the calculation result output by the reaction force corresponding to the deviation margin time calculation unit 25 (reaction force corresponding to the deviation margin time) and the calculation result output by the reaction force corresponding to the lateral position calculation unit 26 (reaction force corresponding to the lateral position), which is set as a first reaction force command value (step S101). Additionally, the reaction force selection section 24c sets the calculation result output by the reaction force corresponding to the turning angle calculation unit 27 (reaction force corresponding to the turning angle) as a second reaction force command value (step S102). Furthermore, the reaction force selection section 24c calculates the values of a first switching gain and a second switching gain, based on the detection result output by the vehicle speed sensor 7a (vehicle speed) (step S103).

At this time, it shall be such that, in a high-speed region (for example, 60 km/h or more), the first switching gain is 1 and the second switching gain is 0, in a low-speed region (for example 40 km/h or less), the first switching gain is 0 and the second switching gain is 1, and when between the low-speed region and the high-speed region, the respective values of the first switching gain and the second switching gain are varied within the range of 0-1, and within the range such that the sum of both values will always be 1. Here, the first switching gain and the second switching gain indicate a ratio (ratio) corresponding to the vehicle speed. The first switching gain indicates the ratio occupied by the first reaction force command value. The second switching gain indicates the ratio occupied by the second reaction force command value. Then, the reaction force selection section 24c calculates the steering reaction force offset amount by adding the value obtained by multiplying the first reaction force command value by the first switching gain, and the value obtained by multiplying the second reaction force command value by the second switching gain (step S104).

Accordingly, it is possible to select the second reaction force command value in a high-speed region, to select the first reaction force command value in a low-speed region, and to blend (blend) the first reaction force command value and the second reaction force command value according to the ratio of the switching gains, when between a low-speed region and a high-speed region. Then, the reaction force selection section 24c outputs the calculated steering reaction force offset amount to the limiter processing section 24d (refer to FIG. 9) (step S105). In this manner, the reaction force corresponding to the deviation margin time calculation unit 25, the reaction force corresponding to the lateral position calculation unit 26, the reaction force corresponding to the turning angle calculation unit 27, and the reaction force selection section 24c form a reaction force command value calculation unit, which calculates the first reaction force command value as well as calculating the second reaction force command value.

Figure 16:
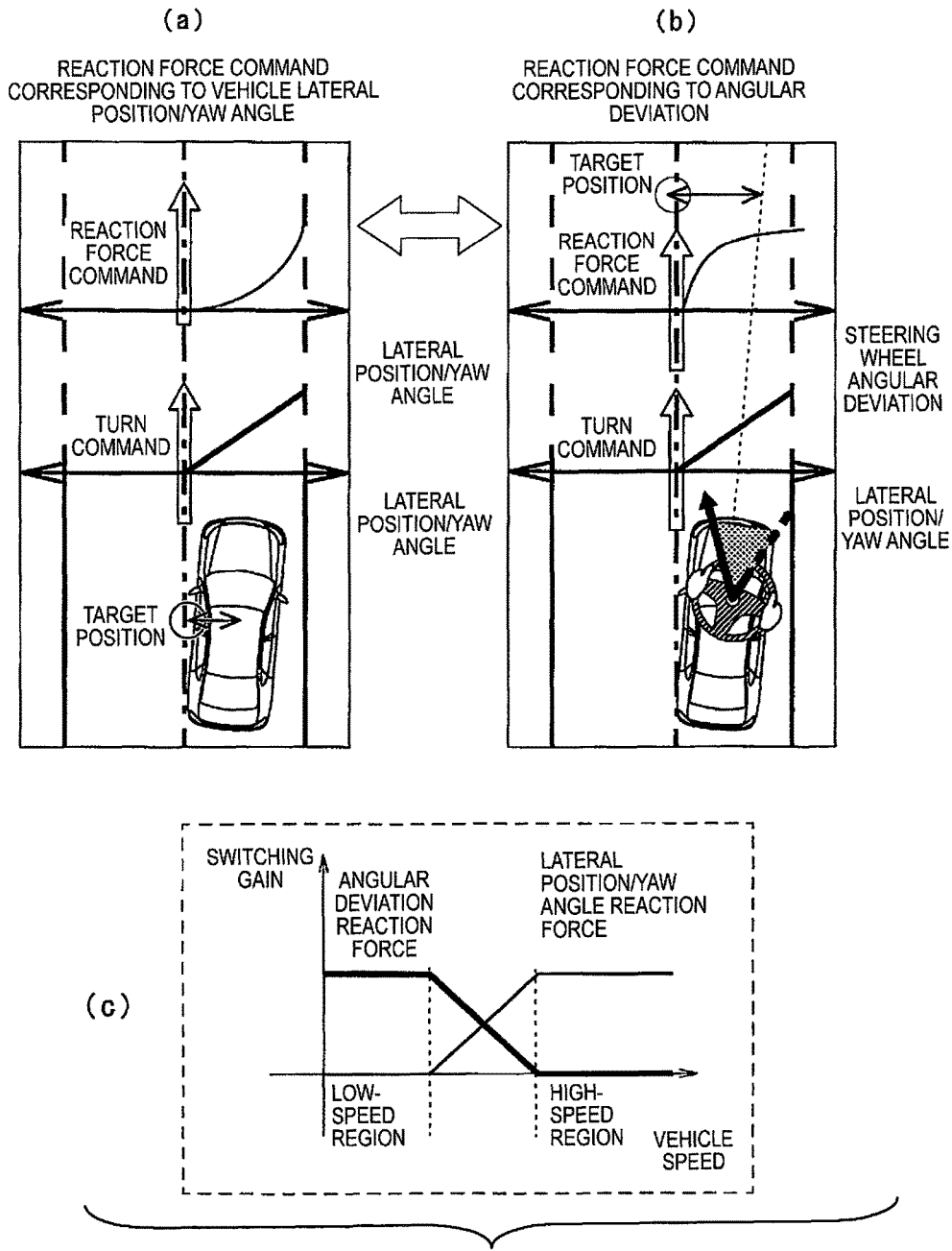
FIG. 16 is an explanatory diagrams describing the calculation method of the steering reaction force offset amount.

FIG. 16 illustrates the vehicle state and the control map when the vehicle A approaches the edge of the lane. Parts (a) and (b) of FIG. 16 illustrate the vehicle state and the control map when the vehicle A approaches the right side edge of the lane. The vehicle state and the control map of when the vehicle A approaches the left side edge of the lane can be obtained by horizontally flipping the content illustrated in parts (a) and (b) of FIG. 16. For example, the first reaction force command value will change as shown in the control map of the reaction force command illustrated in part (a) of FIG. 16, in accordance with changes in the turning command corresponding to changes in the lateral position/yaw angle. Additionally, the second reaction force command value will change as shown in the control map of the reaction force command illustrated in part (b) of FIG. 16. In addition, the reaction force selection section 24c calculates the steering reaction force offset amount by adding the value obtained by multiplying the first reaction force command value by the first switching gain, and the value obtained by multiplying the second reaction force command value by the second switching gain, as illustrated in part (c) of FIG. 16, after calculating the values of the first switching gain and the second switching gain in accordance with the vehicle speed. As a result, the reaction force selection section 24c is able to appropriately select the first reaction force command value and the second reaction force command value in accordance with the vehicle speed.

(1) In the Case of a High-Speed Region

Figure 17:
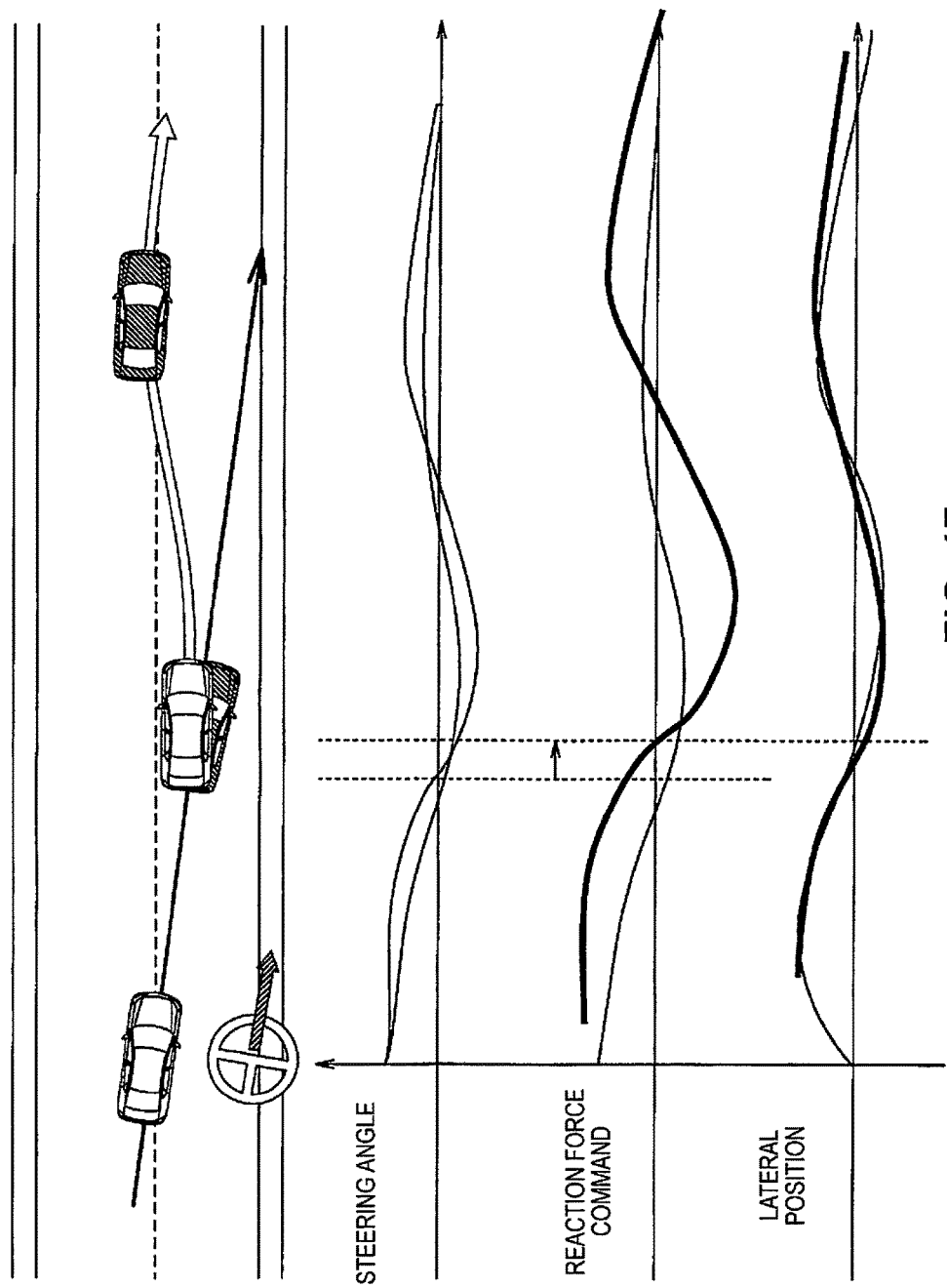
FIG. 17 is a diagrammatic view representing a lane keeping control in a case in which the vehicle is in a high-speed region and is traveling with a constant yaw angle with respect to the lane.

FIG. 17 is a diagram illustrating a lane keeping control in which the vehicle speed of the vehicle A is in a high-speed region and the vehicle is traveling with a constant yaw angle with respect to the lane. In a high-speed region, the amount of change of the steering angle (steering wheel angle) is smaller than in a low-speed region, and it is easier to return the steering angle to straight (neutral position). Additionally, in a high-speed region, the vehicle responsiveness is good with respect to the steering angle, and there is not much delay in the lateral position change. Therefore, in a high-speed region, the control performance is good even with only a reaction force corresponding to the lateral position. If a reaction force corresponding to the steering angle rather than the lateral position is imparted in a high-speed region, the driver is likely to feel discomfort, such as catching, with respect to the steering input. Additionally, since the reaction force amount corresponding to the steering angle is small when in a high-speed region, the reaction force corresponding to the lateral position becomes dominant. In this manner, in the case of a high-speed region, even if lane keeping control is carried out with only a reaction force corresponding to the lateral position of the host vehicle (first reaction force command value), there is no discomfort of the reaction force, and a good control result can be obtained.

(2) In the Case of a Low-Speed Region

Figure 18:
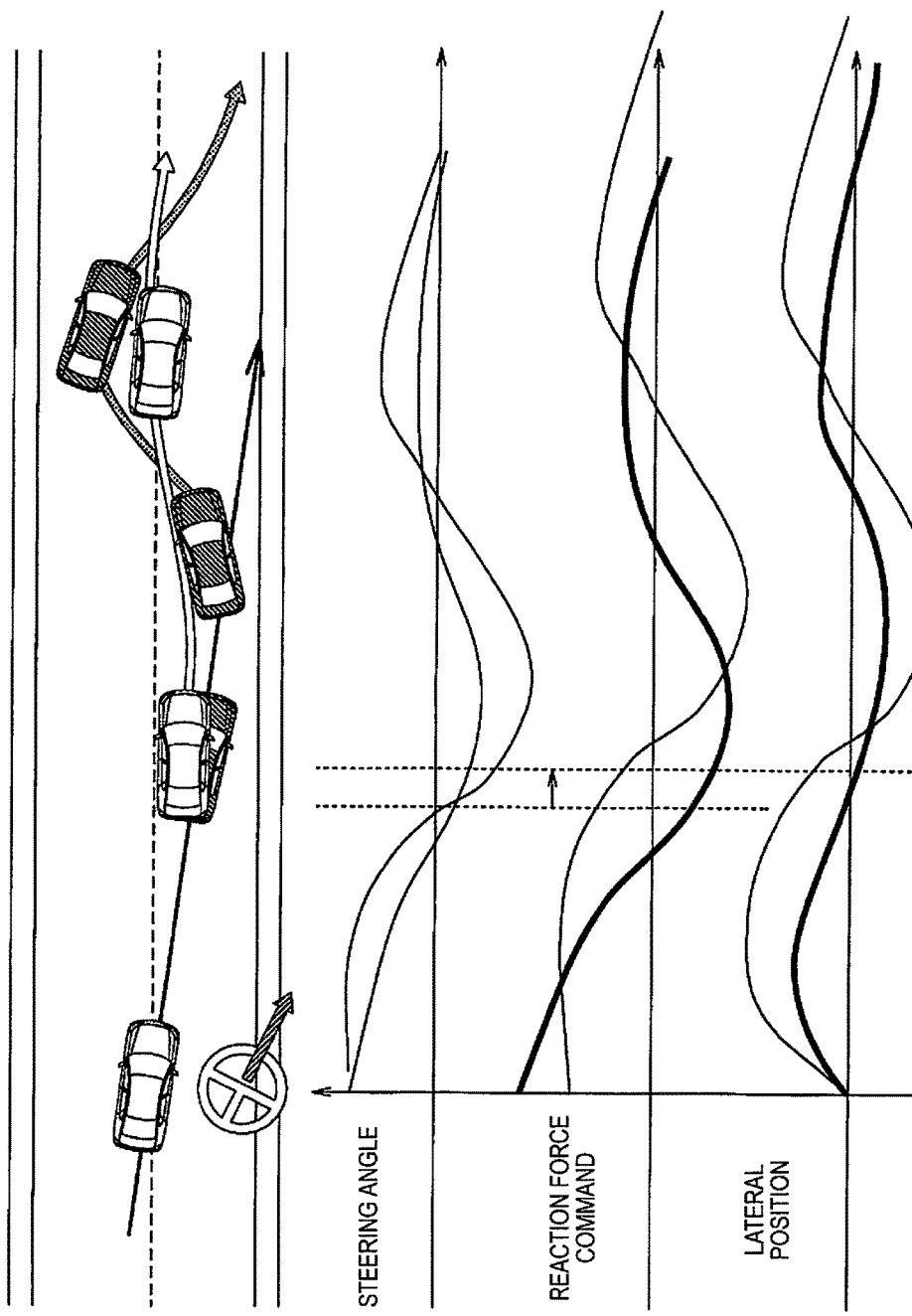
FIG. 18 is a diagrammatic view representing a lane keeping control in a case in which the vehicle is in a low-speed region and is traveling with a constant yaw angle with respect to the lane.

FIG. 18 is a diagram illustrating a lane keeping control in which the vehicle speed of the vehicle A is in a low-speed region and the vehicle is traveling with a constant yaw angle with respect to the lane. In a low-speed region, the amount of change of the steering angle is larger than in a high-speed region, and it is difficult to return the steering angle straight. Additionally, in a low-speed region, the vehicle responsiveness is poor with respect to the steering angle, and a significant delay is generated in the lateral position change. Therefore, in a low-speed region, hunting (hunting) tends to occur by control only of the reaction force corresponding to the lateral position. In this manner, in the case of a low-speed region, if lane keeping control is carried out with only a reaction force corresponding to the lateral position of the host vehicle (first reaction force command value), the steering angle does not return all the way even at the center of the lane, leading to wobble in the traveling direction of the vehicle, and a good control result cannot be obtained. In the case of a low-speed region, the control result becomes favorable by carrying out a lane keeping control according to the present embodiment.

As other methods, the reaction force selection section 24c can also calculate the steering reaction force offset amount by any one of the following methods (1) to (5), regardless of the first and the second switching gains. At this time, a method of calculating the steering reaction force offset amount using the above-described first and second switching gains, and one of the following methods (1) to (5) may be made selectable by a predetermined setting, or the like. However, in practice, the invention is not limited to these methods.

(1) Select-High

When the vehicle speed is lower than a second threshold value, the reaction force selection section 24c selects the larger of the first reaction force command value and the second reaction force command value, and calculates a steering reaction force offset amount corresponding to the selection result.

(2) Total Value

When the vehicle speed is lower than a second threshold value, the reaction force selection section 24c combines the first reaction force command value and the second reaction force command value, and calculates a steering reaction force offset amount corresponding to the combination result.

(3) Switching

When the vehicle speed is lower than a second threshold value, the reaction force selection section 24c switches between the method (1) and method (2) described above, according to whether or not the rotational direction of the steering wheel (the direction of the driver's steering input, etc.) is in the direction that causes the vehicle A to approach the center side of the lane (deviation avoidance side). At this time, if the rotational direction of the steering wheel is in the direction that causes the vehicle A to approach the center side of the lane (deviation avoidance side) (the rotational direction of the steering wheel is the same direction as the direction of the steering reaction force), the reaction force selection section 24c carries out a select-high between the first reaction force command value and the second reaction force command value, to calculate the steering reaction force offset amount. Conversely, if the rotational direction of the steering wheel is in the direction that causes the vehicle A to approach the lane edge (deviation side) (the rotational direction of the steering wheel is a direction different from the direction of the steering reaction force), the reaction force selection section 24c combines the first reaction force command value and the second reaction force command value, to calculate the steering reaction force offset amount.

(4) Average Value

When the vehicle speed is lower than a second threshold value, the reaction force selection section 24c calculates the average value of the first reaction force command value and the second reaction force command value, and calculates a steering reaction force offset amount corresponding to the calculation result. Here, since the reaction force selection section 24c calculates the average value by dividing the sum of the first reaction force command value and the second reaction force command value by two, when the vehicle speed is lower than the second threshold value, in practice, the method (4) is one embodiment of the method (2) described above. In the methods (1)-(4) described above, if the vehicle speed is higher than a first threshold value, the reaction force selection section 24c calculates the steering reaction force offset amount based on the second reaction force command value unconditionally.

(5) Input Limit

When the vehicle speed is higher than a first threshold value (for example, when the vehicle speed is 60 km/h or more), the reaction force selection section 24c inputs the first reaction force command value and limits the input of the second reaction force command value, and when the vehicle speed is lower than the first threshold value (for example, when the vehicle speed is less than 60 km/h), both the first reaction force command value and the second reaction force command value are input. Alternatively, the reaction force selection section 24c may set the value of the second reaction force command value to zero unconditionally, when the vehicle speed is higher than a first threshold value, regardless of the presence/absence of an input of the second reaction force command value. In any case, the reaction force selection section 24c will set the second reaction force command value to zero, when the vehicle speed is higher than a first threshold value.

In the description above, the lane keeping assist device according to the present embodiment carries out lane keeping control so as to return the vehicle A to the center side of the lane, when the vehicle A is close to the lane edge (road white line). However, in practice, when the driver desires to move outside of the lane edge, for example (I) when changing the lane from the traveling lane to an adjacent lane; (II) when moving from the main lane to a branching lane; (III) when moving from a merging lane to the main lane; (IV) when stopping in a road side strip during an emergency; and (V) when entering a parking lot, a shop, etc., along the road, the lane keeping control according to the present embodiment may be interrupted.

Specifically, if there is an area into which the vehicle A can enter (other lanes, junctions, service areas, road side strips, shops, public facilities, parking lots, etc.) outside of the lane edge in the acquired road information, white line information, and the like, it is determined that the driver is wishing to move outside of the lane edge (I) when the turn signal is being operated; (II) when the driver is turning the steering wheel 1a to a steering increase side (deviation side) by a predetermined angle (threshold value) or more; or (III) when the driver continues to turn the steering wheel 1a to a steering increase side (deviation side), even if a steering reaction force torque for returning the vehicle A to the center side of the lane is generated, and the lane keeping control according to the present embodiment is interrupted. For example, a command steering reaction force torque and a command turning angle are not output to the current driver. Conversely, if there are no areas into which the vehicle A can enter outside of the lane edge in the acquired road information, white line information, and the like, it is determined to be impossible to move outside of the lane edge, and the lane keeping control according to the present embodiment is executed unconditionally, even if the driver desires to move outside of the lane edge.

The present embodiment has the following effects.

(1) The lane keeping assist device according to the present embodiment is a lane keeping assist device that assists a vehicle, in which a steering wheel in the vehicle and a turning wheel for turning the vehicle are mechanically detached, to travel within traveling lanes, wherein the lane keeping assist device controls the turning angle of the turning wheel using a first turning angle calculated so as to cause the vehicle to travel in the traveling lane and a second turning angle corresponding to the steering amount of the steering wheel, detects the vehicle speed of the vehicle, calculates a first reaction force command value to the steering wheel corresponding to the first turning angle and a second reaction force command value to the steering wheel corresponding to the second turning angle, controls the steering reaction force to be imparted to the steering wheel to have a steering reaction force that corresponds only to the second reaction force command value when the vehicle speed is higher than a predetermined threshold value (predetermined vehicle speed), and controls the steering reaction force to be imparted to the steering wheel to have a steering reaction force that corresponds to the first reaction force command value and the second reaction force command value when the vehicle speed is at the predetermined threshold value (predetermined vehicle speed) or less.

In another point of view, the lane keeping assist device according to the present embodiment is a lane keeping assist device that assists a vehicle, in which a steering wheel in the vehicle and a turning wheel for turning the vehicle are mechanically detached, to travel within traveling lanes, wherein the lane keeping assist device controls the turning angle of the turning wheel using a first turning angle calculated so as to cause the vehicle to travel in the traveling lane and a second turning angle corresponding to the steering amount of the steering wheel, detects the vehicle speed of the vehicle, calculates a first reaction force command value to the steering wheel corresponding to the first turning angle and a second reaction force command value to the steering wheel corresponding to the second turning angle, and controls the steering reaction force to be imparted to the steering wheel to have a steering reaction force that corresponds to the first reaction force command value and the second reaction force command value. At this time, the first reaction force command value is calculated such that the first reaction force command value becomes larger when the vehicle speed is equal to or less than a predetermined threshold value, compared to when the vehicle speed is higher than the predetermined threshold value.

In the existing technology, the turning angle and the reaction force of a steer-by-wire system are independently controlled according to the yaw angle or the lateral position of the host vehicle. However, even if a steering reaction force torque is imparted to prompt an operation input of the driver when traveling at a low speed, in the same manner as when traveling at a high speed, the actual movement amount of the vehicle is insufficient compared to then traveling at a high speed. On the other hand, in the present embodiment, the steering reaction force is controlled using both a first reaction force command value corresponding to the steering amount and a second reaction force command value corresponding to the turning angle, when traveling at a low speed. As a result, it is possible to obtain an appropriate reaction force even in a low-speed region, which is not a target of lane keeping control in the existing technology, to prevent the host vehicle from deviating from a traveling lane, and to prevent wobble of the vehicle in the traveling direction.

(2) The above-described lane keeping assist device controls the steering reaction force using the total of the values obtained by respectively multiplying the ratio corresponding to the vehicle speed by the first reaction force command value and the second reaction force command value. As a result, it is possible to appropriately select a first reaction force command value and a second reaction force command value, when the vehicle speed of the vehicle is in a high-speed region/low-speed region. Furthermore, when the vehicle speed is between a low-speed region and a high-speed region, it is possible to control the steering reaction force by combining the first reaction force command value and the second reaction force command value at an appropriate ratio.

(3) As another example, the lane keeping assist device described above controls the steering reaction force using the larger of the first reaction force command value and the second reaction force command value, when the vehicle speed is equal to or less than a predetermined threshold value. As a result, it is possible to carry out lane keeping control using a larger reaction force throughout the low-speed region to the high-speed region, compared to when only one reaction force is calculated. In addition, it is possible to appropriately select a reaction force suitable for a high-speed region and a reaction force suitable for a low-speed region, in each case.

(4) Additionally, as another example, the lane keeping assist device described above controls the steering reaction force using the total value of the first reaction force command value and the second reaction force command value, when the vehicle speed is equal to or less than a predetermined threshold value. As a result, it is possible to control the steering reaction force to be imparted to the steering wheel, using a resultant force of the steering reaction force corresponding to the first reaction force command value and the steering reaction force corresponding to the second reaction force command value.

(5) Additionally, as another example, when the vehicle speed is equal to or less than a predetermined threshold value, the lane keeping assist device described above controls the steering reaction force using the larger of the first reaction force command value and the second reaction force command value if the rotational direction of the steering wheel is in a direction to cause the vehicle to approach the center side of the lane, and controls the steering reaction force using the total value of the first reaction force command value and the second reaction force command value, if the rotational direction of the steering wheel is not in a direction to cause the vehicle to approach the center side of the lane. As a result, it is possible to control an appropriate steering reaction force according to the rotational direction of the steering wheel. For example, when the steering wheel is rotating in a direction in which the vehicle returns to the center side of the lane (deviation avoidance side), a reaction force is applied in the same direction as the current rotational direction; therefore, it is possible to select the larger of the first reaction force command value and the second reaction force command value. On the other hand, when the steering wheel is rotating in a direction in which the vehicle approaches the lane edge (deviation side), a reaction force is applied in the opposite direction of the current rotational direction; therefore, it is possible to combine the first reaction force command value and the second reaction force command value. Additionally, it is possible to switch the content of processing for controlling the steering reaction force (select-high, total value), depending on whether the rotational direction of the steering wheel and the direction of the steering reaction force are the same/different.

(6) Additionally, as another example, the lane keeping assist device described above controls the steering reaction force using an average value of the first reaction force command value and the second reaction force command value, when the vehicle speed is equal to or less than a predetermined threshold value. As a result, it is possible to control using an average value that reflects the values of both the first reaction force command value and the second reaction force command value. The characteristics of both the first reaction force command value and the second reaction force command value are reflected in this average value.

(7) In the above-described lane keeping assist device, the value of the second reaction force command value is set to zero when the vehicle speed is higher than a predetermined threshold value. As a result, the lane keeping assist device according to the present embodiment is able to exclude, in advance, the "reaction force corresponding to the turning angle" which is not necessary for controlling the steering reaction force when in a high-speed region, by determining whether or not the vehicle speed is at a threshold value (for example 60 km/h) or more. One embodiment of the present invention was described in detail above, but in practice, present invention is not limited to the above-described embodiment, and any changes that do not depart from the spirit of the present invention are included in the present invention.

The invention claimed is:

1. A lane keeping assist device that assists a vehicle to travel within a traveling lane, in which a steering wheel in the vehicle and a turning wheel for turning the vehicle are mechanically detached, the lane keeping assist device comprising:
a turn control unit that controls a turning angle of the turning wheel using a first turning angle calculated to keep the vehicle in the traveling lane and using a second turning angle that corresponds to a steering amount of the steering wheel;
a vehicle speed detection unit that detects a vehicle speed of the vehicle;
a reaction force command value calculation unit that calculates a first reaction force command value to the steering wheel corresponding to the first turning angle, and that calculates a second reaction force command value to the steering wheel corresponding to the second turning angle; and
a steering reaction force control unit that controls a steering reaction force to be imparted to the steering wheel to correspond only to the second reaction force command value when the vehicle speed is higher than a predetermined threshold value, and that controls the steering reaction force to be imparted to the steering wheel to correspond to the first reaction force command value and the second reaction force command value when the vehicle speed is at the predetermined threshold value or less.

2. The lane keeping assist device according to claim 1, wherein
the steering reaction force control unit is configured to control the steering reaction force using a total of values obtained by multiplying a ratio corresponding to the vehicle speed by the first reaction force command value and the second reaction force command value, respectively.

3. The lane keeping assist device according to claim 1, wherein
the steering reaction force control unit is configured to control the steering reaction force using a larger of the first reaction force command value and the second reaction force command value, when the vehicle speed is equal to or less than the predetermined threshold value.

4. The lane keeping assist device according to claim 1, wherein
the steering reaction force control unit is configured to control the steering reaction force using a total value of the first reaction force command value and the second reaction force command value, when the vehicle speed is equal to or less than the predetermined threshold value.

5. The lane keeping assist device according to claim 1, wherein,
when the vehicle speed is equal to or less than the predetermined threshold value, the steering reaction force control unit is configured to control the steering reaction force using a larger of the first reaction force command value and the second reaction force command value upon determining a rotational direction of the steering wheel is in a direction to cause the vehicle to approach a center side of the lane, and is configured to control the steering reaction force using a total value of the first reaction force command value and the second reaction force command value, upon determining the rotational direction of the steering wheel is not in a direction to cause the vehicle to approach the center side of the lane.

6. The lane keeping assist device according to claim 1, wherein
the steering reaction force control unit is configured to control the steering reaction force using an average value of the first reaction force command value and the second reaction force command value, when the vehicle speed is equal to or less than the predetermined threshold value.

7. The lane keeping assist device according to claim 1, wherein
the steering reaction force control unit is configured to set the second reaction force command value to zero when the vehicle speed is higher than the predetermined threshold value.

8. A lane keeping assist device that assists a vehicle to travel within a traveling lane, in which a steering wheel in the vehicle and a turning wheel for turning the vehicle are mechanically detached, the lane keeping assist device comprising:
a turn control unit that controls a turning angle of the turning wheel using a first turning angle calculated to keep the vehicle in the traveling lane and using a second turning angle that corresponds to a steering amount of the steering wheel;
a vehicle speed detection unit that detects a vehicle speed of the vehicle;
a reaction force command value calculation unit that calculates a first reaction force command value to the steering wheel corresponding to the first turning angle, and that calculates a second reaction force command value to the steering wheel corresponding to the second turning angle; and
a steering reaction force control unit that controls the steering reaction force to be imparted to the steering wheel to correspond the first reaction force command value and the second reaction force command value;
the reaction force command value calculation unit calculating the first reaction force command value such that the first reaction force command value becomes larger when the vehicle speed is equal to or less than a predetermined threshold value as compared to when the vehicle speed is higher than the predetermined threshold value.

9. The lane keeping assist device according to claim 8, wherein
the steering reaction force control unit is configured to control the steering reaction force using a total of values obtained by multiplying a ratio corresponding to the vehicle speed by the first reaction force command value and the second reaction force command value, respectively.

10. The lane keeping assist device according to claim 8, wherein
the steering reaction force control unit is configured to control the steering reaction force using a larger of the first reaction force command value and the second reaction force command value, when the vehicle speed is equal to or less than the predetermined threshold value.

11. The lane keeping assist device according to claim 8, wherein
the steering reaction force control unit is configured to control the steering reaction force using a total value of the first reaction force command value and the second reaction force command value, when the vehicle speed is equal to or less than the predetermined threshold value.

12. The lane keeping assist device according to claim 8, wherein
when the vehicle speed is equal to or less than the predetermined threshold value, the steering reaction force control unit is configured to control the steering reaction force using a larger of the first reaction force command value and the second reaction force command value upon determining a rotational direction of the steering wheel is in a direction to cause the vehicle to approach a center side of the lane, and is configured to control the steering reaction force using a total value of the first reaction force command value and the second reaction force command value, upon determining the rotational direction of the steering wheel is not in a direction to cause the vehicle to approach the center side of the lane.

13. The lane keeping assist device according to claim 8, wherein
the steering reaction force control unit is configured to control the steering reaction force using an average value of the first reaction force command value and the second reaction force command value, when the vehicle speed is equal to or less than the predetermined threshold value.

14. The lane keeping assist device according to claim 8, wherein
the steering reaction force control unit is configured to set the second reaction force command value to zero when the vehicle speed is higher than the predetermined threshold value.

* * * * *